(12) United States Patent
Abotabl et al.

(10) Patent No.: US 11,997,691 B2
(45) Date of Patent: May 28, 2024

(54) FULL-DUPLEX COMMUNICATIONS AND PHYSICAL LAYER SECURITY

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/377,195

(22) Filed: Jul. 15, 2021

(65) Prior Publication Data
US 2023/0018959 A1 Jan. 19, 2023

(51) Int. Cl.
| | | |
|---|---|---|
| *H04W 72/14* | (2009.01) | |
| *H04L 5/14* | (2006.01) | |
| *H04W 12/037* | (2021.01) | |
| *H04W 72/04* | (2023.01) | |
| *H04W 72/0446* | (2023.01) | |
| *H04W 72/0453* | (2023.01) | |
| *H04W 72/12* | (2023.01) | |
| *H04W 72/1263* | (2023.01) | |
| *H04W 72/23* | (2023.01) | |

(52) U.S. Cl.
CPC ............ *H04W 72/23* (2023.01); *H04L 5/14* (2013.01); *H04W 12/037* (2021.01); *H04W 72/0446* (2013.01); *H04W 72/0453* (2013.01); *H04W 72/1263* (2013.01)

(58) Field of Classification Search
CPC ............ H04W 72/23; H04W 12/037; H04W 72/0446; H04W 72/0453; H04W 72/1263; H04L 5/14
See application file for complete search history.

(56) References Cited

U.S. PATENT DOCUMENTS

| | | | | |
|---|---|---|---|---|
| 10,425,810 | B2 * | 9/2019 | Luo | H04W 12/037 |
| 10,536,305 | B2 * | 1/2020 | Shelby | H04L 1/0061 |
| 11,218,247 | B2 * | 1/2022 | Lo | H04L 25/03872 |
| 2014/0013104 | A1 * | 1/2014 | Vinnik | H04L 63/123 |
| | | | | 713/150 |

(Continued)

*Primary Examiner* — Bailor C Hsu
(74) *Attorney, Agent, or Firm* — Holland & Hart LLP

(57) ABSTRACT

Methods, systems, and devices for wireless communications are described. A base station may indicate for a first device to transmit random information in the direction of an adverse device on at least partially overlapping time and frequency resources that are also used for receiving a downlink message from the base station. By transmitting the random information in the direction of the adverse device, the first device may cause entropy overhead to the adverse device, impacting an ability of the adverse device to decode portions of the downlink message transmitted to and intended for the first device. Accordingly, the first device may receive the downlink message and may concurrently transmit the random information in the direction of the adverse device on time and frequency resources that at least partially overlap with time and frequency resources used for receiving the downlink message based on receiving the indication from the base station.

30 Claims, 21 Drawing Sheets

(56) References Cited

U.S. PATENT DOCUMENTS

| | | | |
|---|---|---|---|
| 2014/0198688 A1* | 7/2014 | Li | H04B 1/525 370/278 |
| 2015/0009945 A1* | 1/2015 | Shattil | H04W 12/08 370/329 |
| 2015/0351115 A1* | 12/2015 | Jeon | H04W 48/16 455/450 |
| 2016/0344510 A1* | 11/2016 | Shishkin | H04K 3/45 |
| 2017/0353302 A1* | 12/2017 | Fernandez | H04L 9/14 |
| 2019/0173693 A1* | 6/2019 | Aboul-Magd | H04L 5/143 |
| 2019/0181974 A1* | 6/2019 | Ju | H04L 27/2636 |
| 2020/0228212 A1* | 7/2020 | Xu | H04W 24/10 |
| 2020/0267524 A1* | 8/2020 | Fliess | H04L 1/0075 |
| 2020/0344598 A1* | 10/2020 | Nam | H04W 12/30 |
| 2021/0160111 A1* | 5/2021 | Ma | H04L 5/0044 |
| 2021/0368547 A1* | 11/2021 | Kadiri | H04L 5/0044 |
| 2022/0059232 A1* | 2/2022 | Nishioka | G16H 50/20 |

* cited by examiner

FULL-DUPLEX COMMUNICATIONS AND PHYSICAL LAYER SECURITY

FIELD OF TECHNOLOGY

The following relates to wireless communications, including full-duplex communications and physical layer security.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support full-duplex communications and physical layer security. Generally, the described techniques provide for a full-duplex user equipment (UE) (e.g., that is capable of concurrent reception and transmission) to receive control signaling (e.g., from a base station) indicating for the full-duplex UE to transmit a message on time and frequency resources that at least partially overlap with resources for concurrently receiving (e.g., at least partially overlapping receiving) a downlink message from the base station. For example, the control signaling may indicate that the UE is to transmit information, such as a set of arbitrary bits (e.g., random information), in the message, where the information is intended to prevent an adverse communication device near the UE from receiving at least part of the downlink message, determine information about the UE, determine information about the downlink message, or perform another malicious attack, or some combination thereof. Subsequently, the UE may receive the downlink message on a first set of time and frequency resources according to the control signaling and may concurrently transmit the message including the information, such as the set of arbitrary bits, on a second set of time and frequency resources that at least partially overlap with the first set of time and frequency resources based on the control signaling.

In some examples, the control signaling indicating for the full-duplex UE to transmit the message may include a dynamic grant or a configured grant scheduling the downlink message, the message, or both. Additionally, the control signaling may indicate a size of the message for the full-duplex UE to transmit. In some examples, the message transmitted by the UE that includes the set of arbitrary bits may include a sequence generated with random parameters, a physical uplink control channel (PUCCH) message, a physical uplink shared channel (PUSCH) message, or a combination thereof. Additionally, the control signaling indicating for the full-duplex UE to transmit the message may further indicate one or more transmission parameters for transmitting the message, such as a transmission beam for transmitting the message, a modulation and coding scheme (MCS) for transmitting the message, power control information for transmitting the message, or a combination thereof. In some examples, the full-duplex UE, the base station, or both may determine an amount of overlap between the set of time and frequency resources used for receiving the downlink message (e.g., a first set of time and frequency resources) and a second set of time and frequency resources used for transmitting the message (e.g., a second set of time and frequency resources) based on an amount of self-interference experienced at the full-duplex UE.

A method for wireless communications at a UE is described. The method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits; receiving, from the base station and according to the control signaling, the downlink message on a first set of time and frequency resources; and transmitting, to a device and based on the control signaling, the message including the set of arbitrary bits on a second set of time and frequency resources that at least partially overlap with the first set of time and frequency resources.

An apparatus for wireless communications at a UE is described. The apparatus may include a processor, memory coupled with the processor, and instructions stored in the memory. The instructions may be executable by the processor to cause the apparatus to receive, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits; to receive, from the base station and according to the control signaling, the downlink message on a first set of time and frequency resources; and to transmit, to a device and based on the control signaling, the message including the set of arbitrary bits on a second set of time and frequency resources that at least partially overlap with the first set of time and frequency resources.

Another apparatus for wireless communications at a UE is described. The apparatus may include means for receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits; means for receiving, from the base station and according to the control signaling, the downlink message on a first set of time and frequency resources; and means for transmitting, to a device and based on the control signaling, the message including the set of arbitrary bits on a second set of time and frequency resources that at least partially overlap with the first set of time and frequency resources.

A non-transitory computer-readable medium storing code for wireless communications at a UE is described. The code may include instructions executable by a processor to receive, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits; to receive, from the base station and according to the control signaling, the downlink message on a first set of time and frequency resources; and to transmit, to a device and based on the control signaling, the message including the set of arbitrary bits on a second set of time and frequency resources that at least partially overlap with the first set of time and frequency resources.

In some examples of the method, apparatuses, and non-transitory computer-readable medium described herein, receiving the control signaling may include operations, features, means, or instructions for receiving a dynamic grant scheduling the downlink message, the message, or both.

In some examples of the method, apparatuses, and non-transitory computer-readable medium described herein, receiving the control signaling may include operations, features, means, or instructions for receiving a configured grant scheduling the downlink message, the message, or both.

In some examples of the method, apparatuses, and non-transitory computer-readable medium described herein, the configured grant may indicate that the message is linked to the downlink message.

In some examples of the method, apparatuses, and non-transitory computer-readable medium described herein, receiving the control signaling may include operations, features, means, or instructions for receiving the control signaling including an indication of a size of the message.

Some examples of the method, apparatuses, and non-transitory computer-readable medium described herein may further include operations, features, means, or instructions for receiving a first indication of a set of multiple sizes for the message via radio resource control (RRC) signaling and receiving a second indication of a first size of the set of multiple sizes for the message via downlink control information (DCI).

Some examples of the method, apparatuses, and non-transitory computer-readable medium described herein may further include operations, features, means, or instructions for generating a number of bits for the set of arbitrary bits to transmit in the message based on one or more transmission parameters for the message, where transmitting the message may be based on generating the number of bits for the set of arbitrary bits.

In some examples of the method, apparatuses, and non-transitory computer-readable medium described herein, the one or more transmission parameters for the message include a number of available resources for the message, an MCS, or both.

In some examples of the method, apparatuses, and non-transitory computer-readable medium described herein, transmitting the message may include operations, features, means, or instructions for transmitting a sequence generated with random parameters, a PUCCH message, a PUSCH message, or a combination thereof.

In some examples of the method, apparatuses, and non-transitory computer-readable medium described herein, receiving the control signaling may include operations, features, means, or instructions for receiving one or more transmission parameters for transmitting the message.

In some examples of the method, apparatuses, and non-transitory computer-readable medium described herein, the one or more transmission parameters include a transmission beam for transmitting the message, an MCS for transmitting the message, power control information for transmitting the message, or a combination thereof.

Some examples of the method, apparatuses, and non-transitory computer-readable medium described herein may further include operations, features, means, or instructions for determining an amount of overlap between the first set of time and frequency resources and the second set of time and frequency resources based on an amount of self-interference experienced at the UE.

Some examples of the method, apparatuses, and non-transitory computer-readable medium described herein may further include operations, features, means, or instructions for receiving, from the base station, an indication including the amount of overlap.

Some examples of the method, apparatuses, and non-transitory computer-readable medium described herein may further include operations, features, means, or instructions for transmitting, to the base station, an indication including the amount of overlap.

Some examples of the method, apparatuses, and non-transitory computer-readable medium described herein may further include operations, features, means, or instructions for receiving, from the base station, an indication including a self-interference threshold, where the amount of overlap may be determined based on the self-interference threshold.

In some examples of the method, apparatuses, and non-transitory computer-readable medium described herein, receiving the control signaling may include operations, features, means, or instructions for receiving the control signaling including a bit activating the message in a DCI message scheduling the downlink message.

Some examples of the method, apparatuses, and non-transitory computer-readable medium described herein may further include operations, features, means, or instructions for receiving, from the base station, an indication for the UE to receive the downlink message on the first set of time and frequency resources, where transmitting the message may be based on receiving the indication for the UE to receive the downlink message.

In some examples of the method, apparatuses, and non-transitory computer-readable medium described herein, the control signaling indicating for the UE to transmit the message may be different than other control signaling indicating for the UE to transmit an uplink message to the base station.

A method for wireless communications at a base station is described. The method may include selecting a UE for receiving a downlink message from the base station based on the UE being capable of concurrent reception and transmission in a full-duplex mode; transmitting, to the UE, control signaling indicating for the UE to transmit a message, to a device, on time and frequency resources that at least partially overlap with resources for the downlink message, the control signaling indicating that the message is to include a set of arbitrary bits; and transmitting, to the UE and according to the control signaling, the downlink message on a first set of time and frequency resources that at least partially overlap with the resources for the downlink message.

An apparatus for wireless communications at a base station is described. The apparatus may include a processor, memory coupled with the processor, and instructions stored in the memory. The instructions may be executable by the processor to cause the apparatus to select a UE for receiving a downlink message from the base station based on the UE being capable of concurrent reception and transmission in a full-duplex mode; to transmit, to the UE, control signaling indicating for the UE to transmit a message, to a device, on time and frequency resources that at least partially overlap with resources for the downlink message, the control signaling indicating that the message is to include a set of arbitrary bits; and to transmit, to the UE and according to the control signaling, the downlink message on a first set of time and frequency resources that at least partially overlap with the resources for the downlink message.

Another apparatus for wireless communications at a base station is described. The apparatus may include means for selecting a UE for receiving a downlink message from the base station based on the UE being capable of concurrent reception and transmission in a full-duplex mode; means for transmitting, to the UE, control signaling indicating for the UE to transmit a message, to a device, on time and frequency resources that at least partially overlap with resources for the downlink message, the control signaling indicating that the message is to include a set of arbitrary bits; and means for transmitting, to the UE and according to the control signaling, the downlink message on a first set of time and frequency resources that at least partially overlap with the resources for the downlink message.

A non-transitory computer-readable medium storing code for wireless communications at a base station is described. The code may include instructions executable by a processor to select a UE for receiving a downlink message from the base station based on the UE being capable of concurrent reception and transmission in a full-duplex mode; to transmit, to the UE, control signaling indicating for the UE to transmit a message, to a device, on time and frequency resources that at least partially overlap with resources for the downlink message, the control signaling indicating that the message is to include a set of arbitrary bits; and to transmit, to the UE and according to the control signaling, the downlink message on a first set of time and frequency resources that at least partially overlap with the resources for the downlink message.

In some examples of the method, apparatuses, and non-transitory computer-readable medium described herein, transmitting the control signaling may include operations, features, means, or instructions for transmitting a dynamic grant scheduling the downlink message, the message, or both.

In some examples of the method, apparatuses, and non-transitory computer-readable medium described herein, transmitting the control signaling may include operations, features, means, or instructions for transmitting a configured grant scheduling the downlink message, the message, or both.

In some examples of the method, apparatuses, and non-transitory computer-readable medium described herein, the configured grant may indicate the message is linked to the downlink message.

In some examples of the method, apparatuses, and non-transitory computer-readable medium described herein, transmitting the control signaling may include operations, features, means, or instructions for transmitting the control signaling including an indication of a size of the message.

Some examples of the method, apparatuses, and non-transitory computer-readable medium described herein may further include operations, features, means, or instructions for transmitting a first indication of a set of multiple sizes for the message via RRC signaling and transmitting a second indication of a first size of the set of multiple sizes for the message via DCI.

In some examples of the method, apparatuses, and non-transitory computer-readable medium described herein, transmitting the control signaling may include operations, features, means, or instructions for transmitting one or more transmission parameters for the UE to transmit the message.

In some examples of the method, apparatuses, and non-transitory computer-readable medium described herein, the one or more transmission parameters include a transmission beam for transmitting the message, an MCS for transmitting the message, power control information for transmitting the message, or a combination thereof.

Some examples of the method, apparatuses, and non-transitory computer-readable medium described herein may further include operations, features, means, or instructions for determining an amount of overlap between the first set of time and frequency resources and a second set of time and frequency resources based on an amount of self-interference experienced at the UE.

Some examples of the method, apparatuses, and non-transitory computer-readable medium described herein may further include operations, features, means, or instructions for transmitting, to the UE, an indication including the amount of overlap.

Some examples of the method, apparatuses, and non-transitory computer-readable medium described herein may further include operations, features, means, or instructions for receiving, from the UE, an indication including the amount of overlap.

Some examples of the method, apparatuses, and non-transitory computer-readable medium described herein may further include operations, features, means, or instructions for transmitting, to the UE, an indication including a self-interference threshold, where the amount of overlap may be determined based on the self-interference threshold.

In some examples of the method, apparatuses, and non-transitory computer-readable medium described herein, transmitting the control signaling may include operations, features, means, or instructions for transmitting the control signaling including a bit activating the message in a DCI message scheduling the downlink message.

In some examples of the method, apparatuses, and non-transitory computer-readable medium described herein, selecting the UE may include operations, features, means, or instructions for selecting the UE based on the UE being in proximity to a second UE.

Some examples of the method, apparatuses, and non-transitory computer-readable medium described herein may further include operations, features, means, or instructions for transmitting, to the UE, an indication for the UE to receive the downlink message on the first set of time and frequency resources, where receiving the message may be based on transmitting the indication for the UE to receive the downlink message.

In some examples of the method, apparatuses, and non-transitory computer-readable medium described herein, the control signaling indicating for the UE to transmit the message may be different than other control signaling indicating for the UE to transmit an uplink message to the base station.

DETAILED DESCRIPTION

Figure 1:
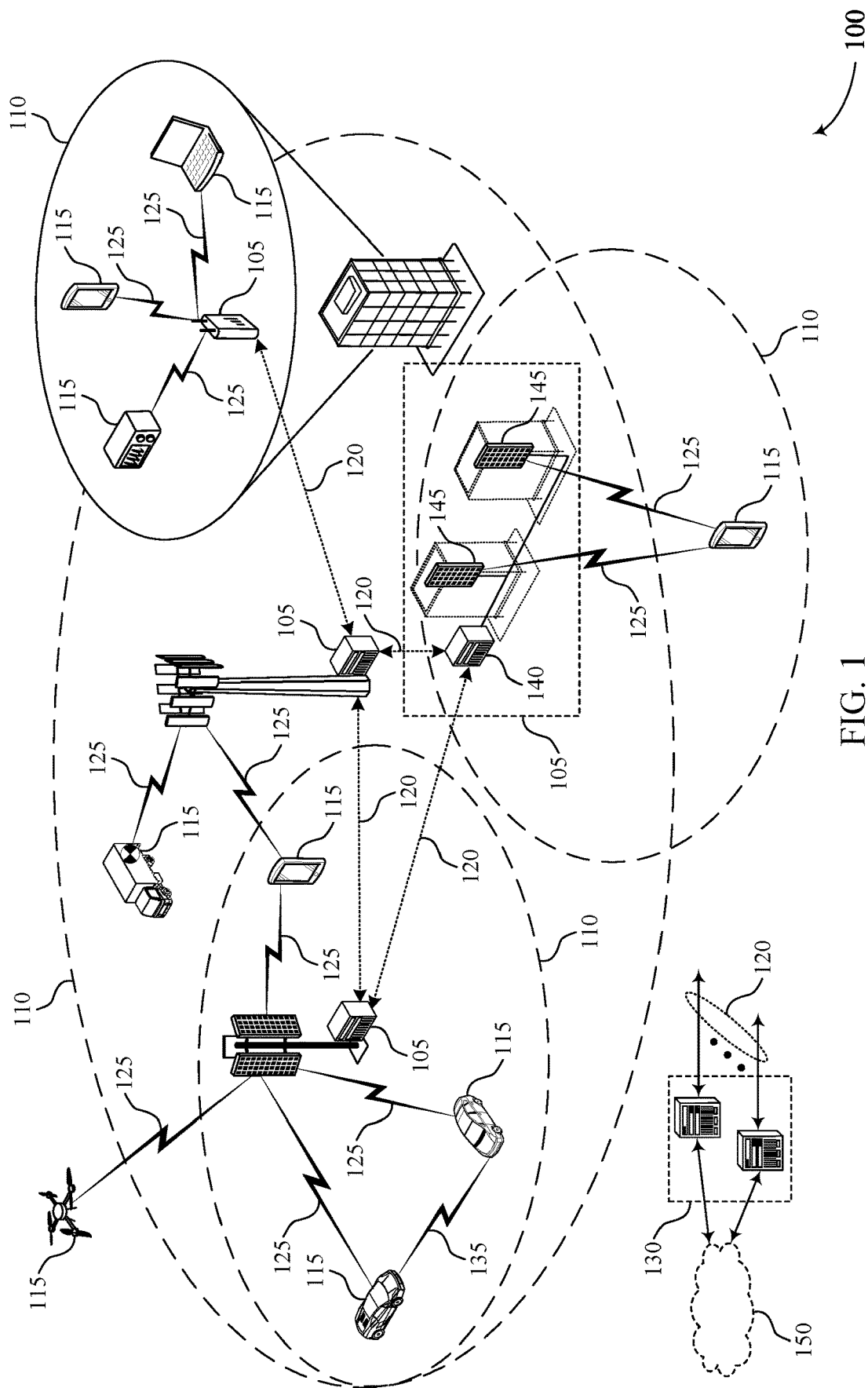
FIG. 1 illustrates an example of a wireless communications system that supports full-duplex communications and physical layer security in accordance with aspects of the present disclosure.

A wireless multiple-access communications system may include one or more base stations or one or more network access nodes, each simultaneously or concurrently supporting communication for multiple communication devices, which may be otherwise known as user equipment (UE). In some examples, a communication device (e.g., a base station, a UE, etc.) may support concurrent transmission and reception as part of a full-duplex mode or full-duplex communications. Techniques are desired for supporting and leveraging full-duplex communications.

In some wireless communications system, a user equipment (UE) may operate in a full-duplex mode, where the UE may transmit on an uplink and receive on a downlink concurrently (e.g., at least partially overlapping), either on the same frequency resource or on different frequency resources which may be separated by a guard band. In some cases, an adverse wireless communication device may be geographically located near (e.g., in close proximity to) a wireless communication device (e.g., the UE operating in the full-duplex mode) attempting to receive downlink transmissions. The adverse wireless communication device may gain access to the transmission and learn information about the intended wireless communication device or the transmitting wireless communication device (or other information), thereby infiltrating the unprotected transmission and placing the intended wireless communication device at risk. Similarly, the adverse wireless communication device may attempt to detect information sent by the transmitting device and may, therefore, learn information regarding the data stored in the transmission. Thus, there exists need for enhanced physical layer security to prevent the adverse wireless communication device from accessing the transmission.

As described herein, if a UE is a full-duplex device (e.g., capable of concurrent transmission and reception) and an adverse wireless communication device is near to the UE, a base station may indicate for the UE to transmit information, such as random information (e.g., a set of arbitrary bits), in the direction of the adverse wireless communication device on at least partially overlapping time and frequency resources that are also used for receiving a downlink message from the base station. By transmitting the information in the direction of the adverse wireless communication device, the UE may cause entropy overhead to the adverse wireless communication device, impacting an ability of the adverse wireless communication device to decode portions of the downlink message transmitted to and intended for the UE. Accordingly, the UE may receive the downlink message from the base station on a first set of time and frequency resources according to control signaling scheduling the downlink message, scheduling the information transmission (e.g., random information transmission), or scheduling both and may concurrently transmit the information (e.g., random information), in the direction of the adverse wireless communication device on a second set of time and frequency resources that at least partially overlap with the first set of time and frequency resources based on the control signaling.

In some examples, the base station may configure (e.g., via the control signaling) the UE to transmit the information (e.g., random information) via dynamic scheduling, an uplink configured grant, an uplink configured grant linked to every downlink transmission from the base station, or a combination thereof. Additionally, a size of the information (e.g., random information) may be configured by the network (e.g., the base station), or a number of bits for the information (e.g., random information) may be generated by the UE based on different transmission parameters (e.g., indicated by the base station). In some examples, when indicating for the UE to transmit the information (e.g., random information), the base station may configure the UE to transmit a sequence generated with parameters (e.g., pseudo-random or random parameters), a physical uplink shared channel (PUSCH), or a physical uplink control channel (PUCCH). Additionally, the base station may configure the UE to transmit the random information with one or more transmission parameters (e.g., a transmission beam, a modulation and coding scheme (MCS), power control information, etc.). In some examples, the base station may activate the information (e.g., random information) transmission via a bit in downlink control information (DCI) scheduling the downlink message. Additionally, the UE, the base station, or both may determine an amount of overlap between the set of time and frequency resources used for receiving the downlink message and the set of time and frequency resources used for transmitting the message based on an amount of self-interference experienced at the UE caused by the full-duplex communications.

Aspects of the disclosure are initially described in the context of wireless communications systems. Additionally, aspects of the disclosure are illustrated through additional wireless communications systems, resource configurations, and a process flow. Aspects of the disclosure are further illustrated by and described with reference to apparatus diagrams, system diagrams, and flowcharts that relate to full-duplex communications and physical layer security.

FIG. 1 illustrates an example of a wireless communications system 100 that supports full-duplex communications and physical layer security in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include one or more UEs 115 (e.g., or additional wireless devices) configured to operate in a full-duplex mode. The UE 115 configured to operate in the full-duplex mode may be able to both transmit and receive signals within a same frame or subframe. A UE 115 that operates in the full-duplex mode may use in-band full-duplex (IBFD), sub-band full-duplex (SBFD), or a combination thereof. A UE 115 that supports IBFD may transmit and receive on same time and frequency resources. Additionally or alternatively, a UE 115 that supports SBFD may transmit and receive on same time resources but on different frequency resources. Wireless communications system 100 may also include one or more base stations 105 configured to operate in a full-duplex mode. In some examples, base stations 105 configured to operate in the full-duplex mode may include at least two panels, where one panel is used for transmitting and another panel is used for receiving, which may allow for simultaneous transmitting and receiving operations.

Based on being configured to operate in the full-duplex mode, a full-duplex device may encounter self-interference (e.g., transmitting signaling in a first transmission direction may affect an ability of the full-duplex device to successfully receive signaling in a second transmission direction at a same time). In some cases, the full-duplex device may use one or more interference cancellation techniques for self-interference mitigation. For example, the full-duplex device may achieve improved isolation of the self-interference (e.g., greater than 50 decibels (dB)) based on using separate panels for simultaneous transmission and reception operations (e.g., a first panel is used for downlink transmissions at both edges of a frequency band and a second panel is used for uplink reception at a middle of the frequency band). Additionally or alternatively, for SBFD operations (e.g., for greater than 40 dB isolation), the full-duplex device may communicate such that different transmission directions occur in different portions of a frequency band, may use a guard band exists between the different transmission directions, may use receiver windowed overlap-and-add (WOLA) processing to reduce an adjacent channel leakage ratio (ACLR) leakage to an uplink signal, may use an analog low-pass filter (LPF) to improve an analog-to-digital converter (ADC) dynamic range, may improve receiver automatic gain control (AGC) states to improve a noise figure (NF), or a combination thereof to aid in mitigating self-interference. Additionally or alternatively, for a digital integrated circuit (IC) of an ACLR leakage (e.g., for greater than 20 dB isolation), the full-duplex device may use a non-linear model per each transmission-reception pair to aid in mitigating self-interference.

In some cases, devices in wireless communications system 100 may operate in an unlicensed radio frequency spectrum band, where the unlicensed radio frequency spectrum band is shared with other communication devices (e.g., other UEs) in wireless communications system 100. For example, in unlicensed radio frequency spectrum band, NR may coexist with, for example, Wi-Fi or any other wireless communications network. In the case of Wi-Fi, NR and Wi-Fi may coexist in the 5 GHz and 6 GHz band. The other communications network may perform channel access at a specific frequency units, for example, Wi-Fi channel access may be in 20 MHz units.

To gain access to a channel on an unlicensed radio frequency spectrum band, a device may perform a clear channel assessment (CCA) procedure, such as a listen-before-talk (LBT) procedure, before transmission. The CCA procedure may occur over a set of CCA resources. In some cases, the resources in time and frequency at which the device (e.g., a UE 115, a base station 105, etc.) performs energy measurements for a CCA may be referred to as a CCA window. For an LBT procedure, a device or a node may sense the channel by detecting the energy in a given frequency band. If the detected energy is below a given threshold, the device may determine that the channel is available, and the device can use the channel for transmission. If the detected energy is above the threshold, the device may determine that the channel is occupied, and the device may back off and perform another LBT until the channel is determined to be available. In some examples, the LBT procedure may be performed within a portion of the LBT resources. Upon performing a successful LBT procedure (e.g., the channel is available), the device may be granted a channel occupancy time (COT) to transmit on the channel.

In order to perform LBT procedures in the frequency domain, the network may determine units of basic channel access, such as LBT bandwidth. Each LBT bandwidth may include an available set of RBs (e.g., multiple RB sets within a BWP). The RB set may be derived from intra-cell guard band signaling, which may be configured separately for downlink and uplink (e.g., intraCellGuardBandDL and intraCellGuardBandUL). It may be that the guard band size is zero when a base station 105 or UE 115 may perform an all or nothing transmission. Therefore, in the frequency domain, the LBT resources are determined based on RB sets.

A channel access LBT mechanism may be one of multiple different types of LBT procedure, which may be referred to as different categories of LBT procedure. Load based equipment (LBE) may use a Category 4 (Cat 4) LBT to contend for a COT and may use a Category 2 (Cat 2) LBT procedure for inside the COT. Cat 2 LBT procedures may be used for discovery reference signal (DRS) transmission under some constraints, such as if the device does not have unicast data, a length of the transmission is 1 ms or shorter, and a duty cycle does not exceed ½₀. A Cat 4 LBT procedure may have a contention window and in some cases be referred to as a Type 1. A Type 2A Cat 2 LBT procedure may have a 25 microsecond gap, and a Type 2B Cat 4 LBT procedure may have a 16 microsecond gap. A Cat 1 LBT procedure (Type 2B) may have no more than a 16 microsecond gap without channel sensing, and a transmission burst length of, for example, 0.584 milliseconds may be applied when using the Cat 1 LBT procedure.

A full-duplex device or full-duplex node (e.g., a full-duplex UE 115, a full-duplex base station 105, etc.) may receive signaling in a first transmission direction (e.g., downlink communications) and transmit signaling in a second transmission direction (e.g., uplink communications) at the same time. For IBFD, the full-duplex device may transmit and receive on same time and frequency resources. For sub-band FDD (e.g., flexible duplex), the full-duplex device may transmit and receive at a same time (e.g., on same time resources) but on different frequency resources. Flexible duplex may be referred to as SBFD. The frequency resources for different transmission directions (e.g., uplink and downlink) may be separated by a guard band in the frequency domain.

In some cases, to prevent unwanted wireless communications devices from accessing transmissions, a device may implement or use physical layer security, encryption, or both. Physical layer security may rely on filling a dropper capacity of a potential attacker (e.g., an adverse wireless communication device) with information, such as arbitrary information (e.g., garbage), so that the potential attacker receives zero information from a transmitter attempting to transmit information or signals to an intended device. This arbitrary information may include random information that the transmitter sends with a code rate that fills the capacity of the potential attacker (e.g., adversary) such that the potential attacker fails in detecting any useful information from the transmitter. That is, physical layer security may include a physical layer procedure that exploits the statistics of a channel to hide information instead of relying on security keys like in encryption. Encryption may involve hiding the data sent during transmission (e.g., by encrypting the data based on security keys) at the cost of increased computational power and system latency compared to physical layer security (e.g., encryption may involve extra processing in higher layers at both an encryption/transmitter device and a decryption/receiving device, which might cause extra latency compared to physical layer security).

When a wireless device (e.g., a UE 115) receives transmissions from another wireless communication device (e.g., a base station 105), an adverse wireless communication device (e.g., another UE 115) may attempt to access the channel used for transmission. In some cases, encryption may be a weak solution to prevent the adverse wireless communication device from accessing the channel if the adverse wireless communication device is computationally capable. To more efficiently and effectively prevent unwanted wireless communication devices from accessing transmissions, there may be a need for physical layer security that prevents those unwanted wireless communication devices (e.g., such as an adverse wireless communication device) from accessing the channel.

In some cases, an adverse wireless communication device may be geographically located near (e.g., in close proximity to) a wireless communication device attempting to receive downlink transmissions. The adverse wireless communication device may gain access to the downlink transmission and learn information about the wireless communication device that was intended to receive the downlink transmission, thereby infiltrating the unprotected transmission and placing the intended wireless communication device at risk. Similarly, the adverse wireless communication device may attempt to detect information sent by the device transmitting the downlink transmission and may, therefore, learn information regarding the data stored in the transmission. Thus, there may exist a need for enhanced physical layer security to prevent the adverse wireless communication device from accessing the transmission.

As described herein, wireless communications system 100 may support techniques for a UE 115 to leverage full-duplex communications to send information, such as random information (e.g., a set of arbitrary bits), in the direction of a nearby adverse wireless communication device on overlapping time and frequency resources used for receiving a downlink transmission from a base station 105, thereby causing overhead for the adverse wireless communication device and decreasing an ability of the adverse wireless communication device to decode the downlink transmission. That is, the UE 115 may achieve directional physical layer security based on utilizing full-duplex communications. For example, using the techniques described herein, the UE 115 may assist in securing its own reception by concurrently transmitting the information, such as the random information (e.g., the set of arbitrary bits), in the direction of the adverse wireless communication device, while also filtering its own self-interference. As used herein, the random information may be or include pseudo-random information in some examples, among other options.

Figure 2:
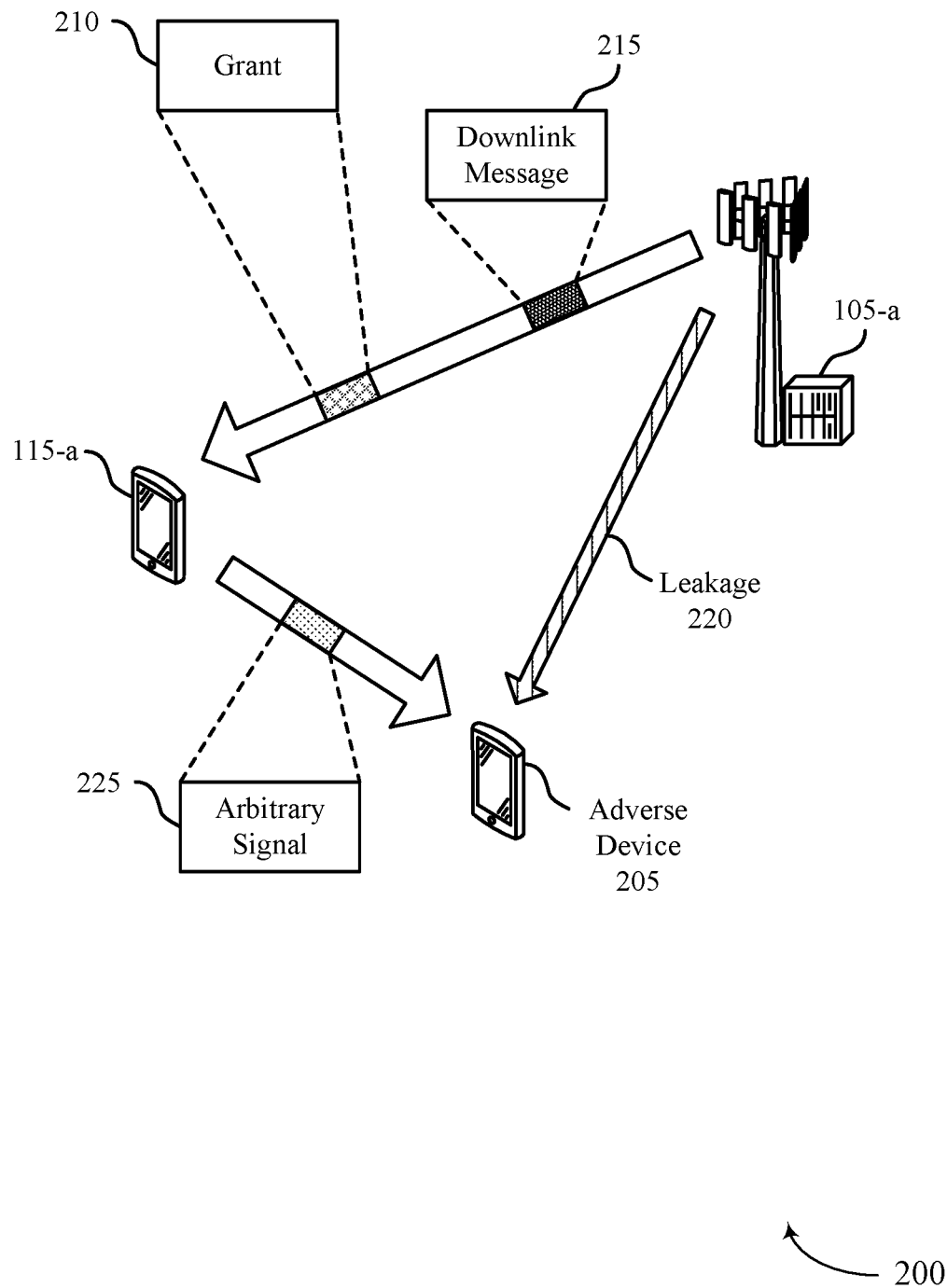
FIGS. 2 and 3 illustrate examples of wireless communications systems in accordance with aspects of the present disclosure.

FIG. 2 illustrates an example of a wireless communications system 200 that supports multiple thresholds for unlicensed channel access for full-duplex nodes in accordance with aspects of the present disclosure. In some examples, wireless communications system 200 may implement aspects of or may be implemented by aspects of wireless communications system 100. For example, wireless communications system 200 may include a base station 105-a and a UE 115-a, which may represent examples of corresponding base stations 105 and UEs 115, respectively, as described with reference to FIG. 1. In some examples, base station 105-a, UE 115-a, or both may support half-duplex communications or full-duplex communications or both. While shown using base station 105-a and UE 115-a, the techniques described herein may be performed by additional devices capable of full-duplex communications.

In some examples, base station 105-a may have a downlink message 215 to transmit to UE 115-a, but an adverse device 205 (e.g., an adverse wireless communication device, a potential attacker, etc.) may be near UE 115-a, such that the adverse device 205 can detect and potentially receive a leakage 220 corresponding to the downlink message 215 intended for UE 115-a. As described herein, base station 105-a may transmit a grant 210 to UE 115-a that indicates for UE 115-a to transmit random information in the form of an arbitrary signal 225 in the direction of the adverse device 205 on at least partially overlapping time and frequency resources as the resources used to receive the downlink message 215. Subsequently, UE 115-a may receive the downlink message 215 from base station 105-a on a first set of time and frequency resources and may concurrently transmit the arbitrary signal 225 in the direction of the adverse device 205 on a second set of time and frequency resources that at least partially overlap with the first set of time and frequency resources. That is, UE 115-a may transmit the arbitrary signal 225 on a same set of resources or on resources that at least partially overlap with the resources used to receive the downlink message 215.

Accordingly, if the adverse device 205 attempts to access the downlink message 215, such as via the leakage 220, the arbitrary signal 225 transmitted by UE 115-a in the direction of the adverse device 205 may increase signaling overhead and entropy for the adverse device 205, thereby decreasing an ability of the adverse device 205 to decode the downlink message 215 and from potentially learning secure information about UE 115-a, base station 105-a, the contents of the downlink message 215, or a combination thereof.

Base station 105-a (e.g., a transmitting device) may configure UE 115-a (e.g., the intended receiving device for the downlink message 215) to transmit the arbitrary signal 225 in at least a partially overlapping time used for receiving the downlink message 215 in a specified direction to provide protection from any possible nearby adverse devices, such as adverse device 205. For example, base station 105-a may configure UE 115-a to transmit arbitrary signal 225 via the grant 210, where the grant 210 may include dynamic scheduling, an uplink configured grant, an uplink configured grant linked to every downlink transmission, or any combination thereof. In some examples, the grant 210 may also schedule the downlink message 215, or base station 105-a may transmit an additional grant to UE 115-a scheduling the downlink message 215.

In some examples, UE 115-a may randomly generate bits to a specified size for the arbitrary signal 225 because there is not actual information being transmitted with the arbitrary signal 225. The size of the random information transmitted in the arbitrary signal 225 may need to be a substantial size because if the amount of randomly generated bits are too small, the adverse device 205 may detect that UE 115-a is merely transmitting random information and can subtract the random bits from the leakage 220 to detect information from downlink message 215.

Accordingly, base station 105-a or another network device may configure the size of the randomly generated bits and may indicate this size to UE 115-a. For example, base station 105-a may explicitly signal the size for the arbitrary signal 225 to UE 115-a. Additionally or alternatively, base station 105-a may configure multiple potential sizes for the arbitrary signal 225 via RRC signaling (e.g., an RRC protocol) and then may transmit a DCI to UE 115-a that indicates and selects a given size for the arbitrary signal 225 from the multiple potential sizes configured via the RRC signaling. Accordingly, UE 115-a may generate the random bits for the arbitrary signal 225 based on the indications from base station 105-a. Additionally or alternatively, UE 115-a may determine a size for the randomly generated bits of the arbitrary signal 225 based on an amount of available resources for transmission and other transmission parameters configured by base station 105-a, such as an MCS.

Additionally, base station 105-a may configure how UE 115-a transmits the arbitrary signal 225 (e.g., via the grant 210). For example, base station 105-a may configure UE 115-a to transmit a sequence generated with random parameters (e.g., similar to sounding reference signal (SRS) transmissions). Additionally or alternatively, base station 105-a may configure UE 115-a to transmit the arbitrary signal on a PUSCH, a PUCCH, another type of uplink channel, a sidelink channel, or a different type of channel. In some examples, base station 105-a may also configure UE 115-a with certain configurations specific to the secrecy-based transmissions for transmitting the arbitrary signal 225. For example, the configurations for transmitting the arbitrary signal 225 (e.g., a secrecy-based transmission) may include indications of a transmission beam, an MCS, power control information, or a combination thereof for the UE 115-a to use to transmit the arbitrary signal 225. Additionally, the configurations for the arbitrary signal 225 (e.g., for secrecy-based transmissions) may be different than configurations for uplink transmissions for UE 115-a to send.

In some examples, base station 105-a may configure UE 115-a for secrecy-based uplink grants as a function of downlink message reception for transmitting the arbitrary signal 225 when receiving the downlink message 215. For example, base station 105-a may configure UE 115-a with uplink transmissions (e.g., transmission of the arbitrary signal 225) that totally or at least partially overlap with resources used for downlink reception (e.g., for receiving downlink message 215). In some examples, base station 105-a may activate the uplink transmissions via a bit in a DCI that schedules the downlink transmission (e.g., if the grant 210 schedules the downlink message 215, a bit in the grant 210 may indicate for UE 115-a to transmit the arbitrary signal 225 on at least partially overlapping resources that are configured for the downlink message 215). That is, the bit in the DCI may be considered an indication of whether UE 115-a is to secure downlink reception (e.g., of downlink message 215) or not.

Additionally, for a partial overlap of resources between the reception of the downlink message 215 and the transmission of the arbitrary signal 225, UE 115-a may autonomously adjust the amount of overlap based on self-interference levels at UE 115-a. For example, UE 115-a may determine an amount of self-interference at itself arising from full-duplex communications and may increase or decrease the amount of resource overlap between transmission and reception based on that amount of self-interference (e.g., compared to one or more self-interference thresholds). In some examples, if the amount of self-interference is high (e.g., above a self-interference threshold), UE 115-a may decrease the amount of resource overlap to potentially decrease the self-interference. Additionally or alternatively, if the amount of self-interference is low (e.g., below a self-interference threshold), UE 115-a may increase the amount of resource overlap for more efficient utilization of communication resources while still managing the self-interference. In some examples, the amount of overlap for the resources used for receiving the downlink message 215 and for transmitting the arbitrary signal 225 may be indicated via signaling between UE 115-a and base station 105-a (e.g., based on resources indicated or configured for the downlink message 215, the arbitrary signal 225, or both).

Based on the techniques described herein, a wireless communication device acting in a full-duplex mode (e.g., UE 115-a) may create a physical layer security by leveraging the full-duplex mode to transmit random information while concurrently receiving a downlink message, where the transmitted random information may preempt an adverse device from obtaining or extracting secure information from the downlink message. Accordingly, wireless communications system 200 may enable or support enhanced security for transmitting messages between intended wireless communication devices, thereby reducing system latency caused by other security techniques, such as encryption.

Figure 3:
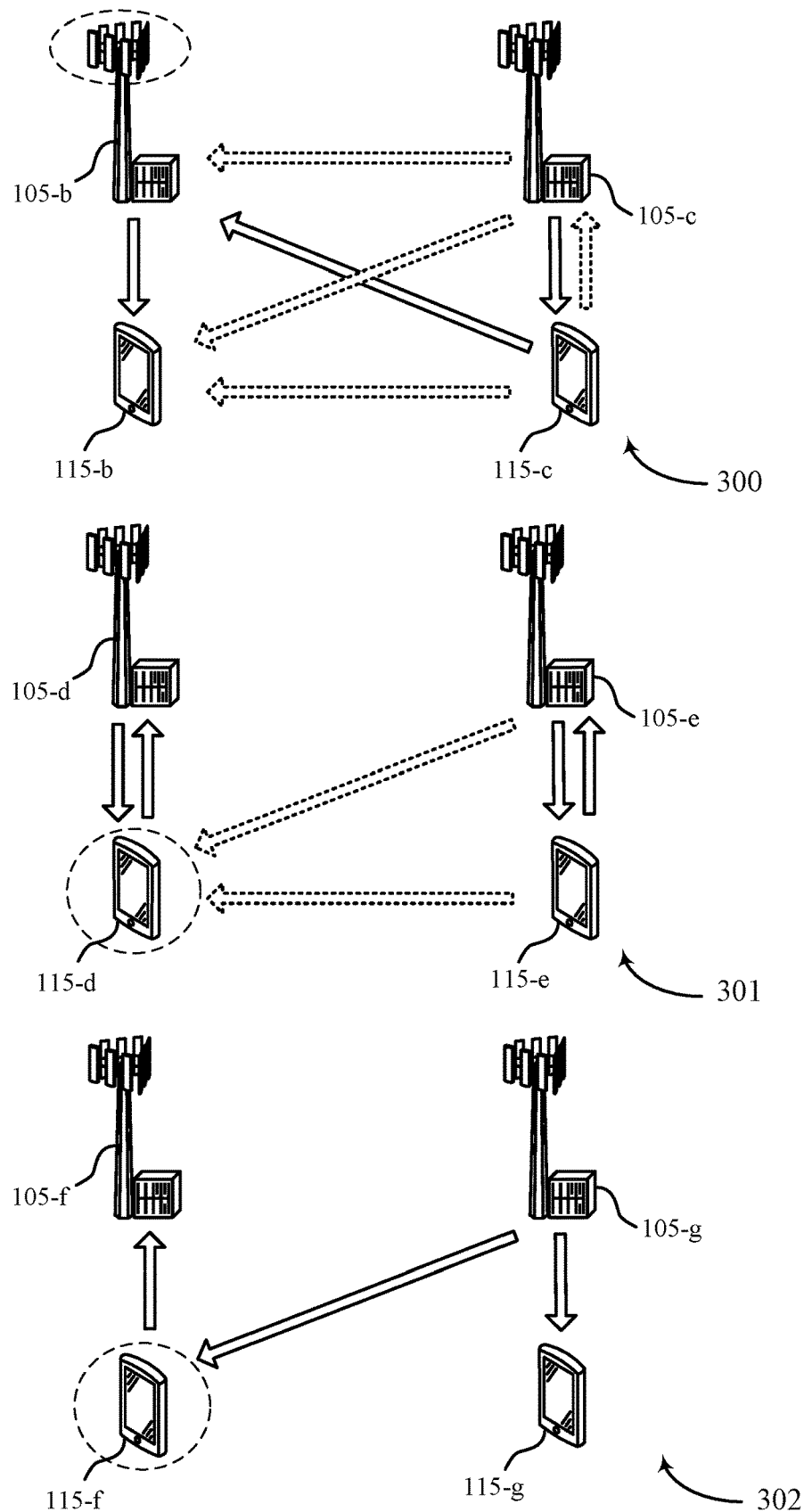

FIG. 3 illustrates examples of wireless communications systems 300, 301, and 302 that support multiple thresholds for unlicensed channel access for full-duplex nodes in accordance with aspects of the present disclosure. Wireless communications systems 300, 301, and 302 may implement aspects of or may be implemented by aspects of wireless communications system 100, wireless communications system 200, or both. For example, wireless communications systems 300, 301, and 302 may each include one or more UEs 115 and one or more base stations 105, which may be examples of UEs 115 and base stations 105 described with reference to FIGS. 1-2. Wireless communications systems 300, 301, and 302 may support half-duplex communications or full-duplex communications or both.

Wireless communications systems 300, 301, and 302 may each show an example of self-interference that occurs as a result of full-duplex communications either at a UE 115 or at a base station 105. In self-interference, a full-duplex device may experience interference from a signal which is communicated by the same full-duplex device (e.g., at a receiving or sensing side of the full-duplex device). For example, a transmission by a full-duplex device may interfere with reception at the full-duplex device, as energy propagated by antennas used for the transmission may reach antennas used for reception. In some cases, a full-duplex device may experience interference which may impact an LBT procedure performed at the full-duplex device. Although the full-duplex device may be capable of transmission and reception simultaneously, a first signal received by the full-duplex device may prevent the full-duplex device from gaining access to a channel to transmit a second signal.

In the example of wireless communications system 300, a base station 105-b may experience self-interference from downlink communications to uplink communications. For example, in wireless communications system 200, the base stations 105 may be configured for full-duplex communications, and the UEs 115 may be configured for half-duplex communications. In an example, base station 105-b may transmit downlink signaling to a UE 115-b using at least one antenna panel and receive uplink signaling from a UE 115-c using another antenna panel. This transmission of downlink signaling to UE 115-b at a same time as reception of uplink signaling from UE 115-c may cause self-interference at base station 105-b, as energy propagated from the transmitting antennas may interfere with the receiving antennas. Additionally or alternatively, base station 105-b may experience some interference from transmissions by a base station 105-c, such as base station-to-base station signaling or downlink signaling to a UE 115 (e.g., UE 115-b or UE 115-c). In some cases, signaling from UE 115-c (e.g., to the base stations 105 or to UE 115-b directly) may cause interference to the downlink reception at the UE 115-b.

In the example of wireless communications system 301, the base stations 105 and the UEs 115 may be configured for full-duplex communications. Wireless communications system 301 may show an example of uplink-to-downlink self-interference at a UE 115-d. For example, a base station 105-d may transmit downlink signaling to UE 115-d, which UE 115-d may receive via at least one antenna panel of UE 115-d. UE 115-d may also transmit uplink communications to base station 105-d via another antenna panel of UE 115-d. This concurrent receiving of downlink signaling and transmitting of uplink communications may cause self-interference at UE 115-d, as energy propagated from the transmitting antennas of UE 115-d may affect the antennas receiving the downlink signaling. Additionally or alternatively, downlink signaling from base station 105-d or transmission from a UE 115-*e* may cause interference at UE 115-*d* (e.g., interfering with receiving the downlink signaling from base station 105-*d*).

In the example of wireless communications system 302, a UE 115-*f* may be configured for full-duplex communications. UE 115-*f* may experience uplink-to-downlink self-interference. For example, UE 115-*f* may transmit uplink communications to a base station 105-*f*, as well as receive downlink communications from a base station 105-*g*. Base station 105-*g* may transmit downlink signaling to both UE 115-*f* and a UE 115-*g*. The simultaneous transmission and reception may cause self-interference at UE 115-*f*. For example, simultaneously transmitting the uplink signaling to base station 105-*f* and receiving the downlink signaling from base station 105-*g* may result in energy from the transmitting antennas interfering with the receiving antennas.

Some wireless communications systems may implement techniques to prevent self-interference. For example, a full-duplex device may use separate panels for transmission and reception, which may be located at different places on the device to mitigate interference. In addition to mitigating self-interference that arises as a result of full-duplex communications, using the techniques described herein, a device that supports full-duplex communications may be configured to transmit a message on time and frequency resources that at least partially overlap with resources for receiving a downlink message from a transmitting device, where the message includes a set of arbitrary bits (e.g., random information). Accordingly, the full-duplex device may achieve directional physical layer security based on utilizing full-duplex communications by assisting in securing its own reception by concurrently transmitting the set of arbitrary bits in the direction of an adverse wireless communication device, while also filtering its own self-interference.

Figure 4:
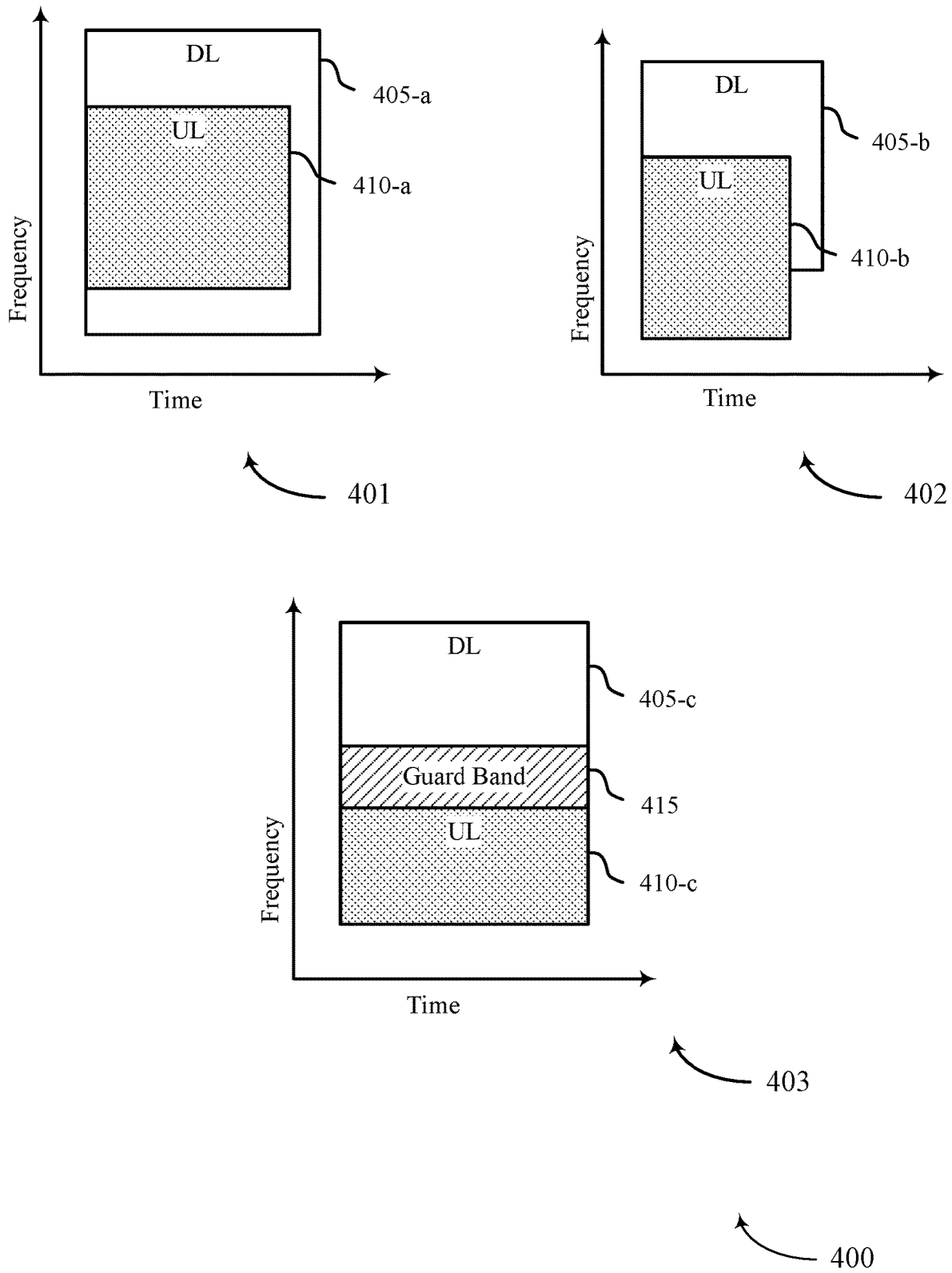
FIG. 4 illustrates examples of resource configurations in accordance with aspects of the present disclosure.

FIG. 4 illustrates an example of resource configurations 400 that support multiple thresholds for unlicensed channel access for full-duplex nodes in accordance with aspects of the present disclosure. The resource configurations 400 may implement aspects of or may be implemented by aspects of wireless communications system 100, wireless communications system 200, wireless communications system 300, wireless communications system 301, wireless communications system 302, or a combination thereof. For example, resource configurations 400 may illustrate resource allocations for wireless communications between a base station 105 and a UE 115 as described with reference to FIGS. 1-3. Resource configurations 400 may include a resource configuration 401, a resource configuration 402, and a resource configuration 403. Resource configurations 400, including resource configuration 401, resource configuration 402, and resource configuration 403 may be examples of resource configurations configured by the base station 105 according to a full-duplex capability of a device (e.g., a full-duplex device, such as a full-duplex UE 115, a full-duplex base station 105, etc.).

Resource configuration 401 may be an example of a fully overlapping IBFD resource allocation. For example, a base station 105 may allocate downlink resources 405-*a* and uplink resources 410-*a* for a UE 115 in overlapping frequency resources (e.g., uplink resources 410-*a* are fully contained within downlink resources 405-*a*). For example, downlink resources 405-*a* and uplink resources 410-*a* may overlap such that a UE 115 transmits and receives on the same time and frequency resources. In some cases, a UE 115 may receive an indication that downlink resources 405-*a* carry a downlink transmission that overlaps in time with an uplink transmission on uplink resources 410-*a* to the base station 105. Accordingly, the UE 115 may determine that the downlink transmissions are to be received in a high-interference environment and may decode the downlink transmission accordingly.

Resource configuration 402 may be an example of a partially overlapping IBFD resource allocation. For example, a base station 105 may allocate downlink resources 405-*b* and uplink resources 410-*b* for a UE 115 in partially overlapping time and frequency resources, such that the UE 115 and the base station 105 may transmit and receive on at least an overlapping portion of time and frequency resources. In some cases, other portions of downlink resources 405-*b* and uplink resources 410-*b* may not overlap in time or frequency, or both.

Resource configuration 403 may be an example of an SBFD resource allocation. For example, a base station 105 may allocate downlink resources 405-*c* and uplink resources 410-*c* for a UE 115 in separate frequency resources that occur during a same time period, such that the UE 115 and the base station 105 may transmit and receive over overlapping time resources and different frequency resources on the same radio frequency spectrum band. In some examples, downlink resources 405-*c* and uplink resources 410-*c* may be separated in frequency by a guard band 415. Guard band 415 may be, for example, one or a few RBs (e.g., five RBs) separating downlink resources 405-*c* and uplink resources 410-*c* in the frequency domain.

As described herein, a full-duplex device may achieve directional physical layer security based on utilizing full-duplex communications. For example, using the techniques described herein, the full-duplex device may assist in securing its own reception by concurrently transmitting random information (e.g., a set of arbitrary bits) in the direction of an adverse wireless communication device as described with reference to FIG. 2, while also filtering its own self-interference. In some cases, the adverse wireless communication device may be geographically located near (e.g., in close proximity to) the full-duplex device attempting to receive downlink transmissions. The adverse wireless communication device may attempt to gain access to the downlink transmission and learn information about the full-duplex device that was intended to receive the downlink transmission, the device transmitting the downlink transmission, or both. Accordingly, the device transmitting the downlink transmission or a scheduling network device (e.g., a base station 105) may detect the adverse wireless communication device (e.g., a possible attacker) is near the full-duplex device and may indicate for the full-duplex device to transmit the random information in the direction of the adverse wireless communication device based on detecting the adverse wireless communication device is near the full-duplex device.

Figure 5:
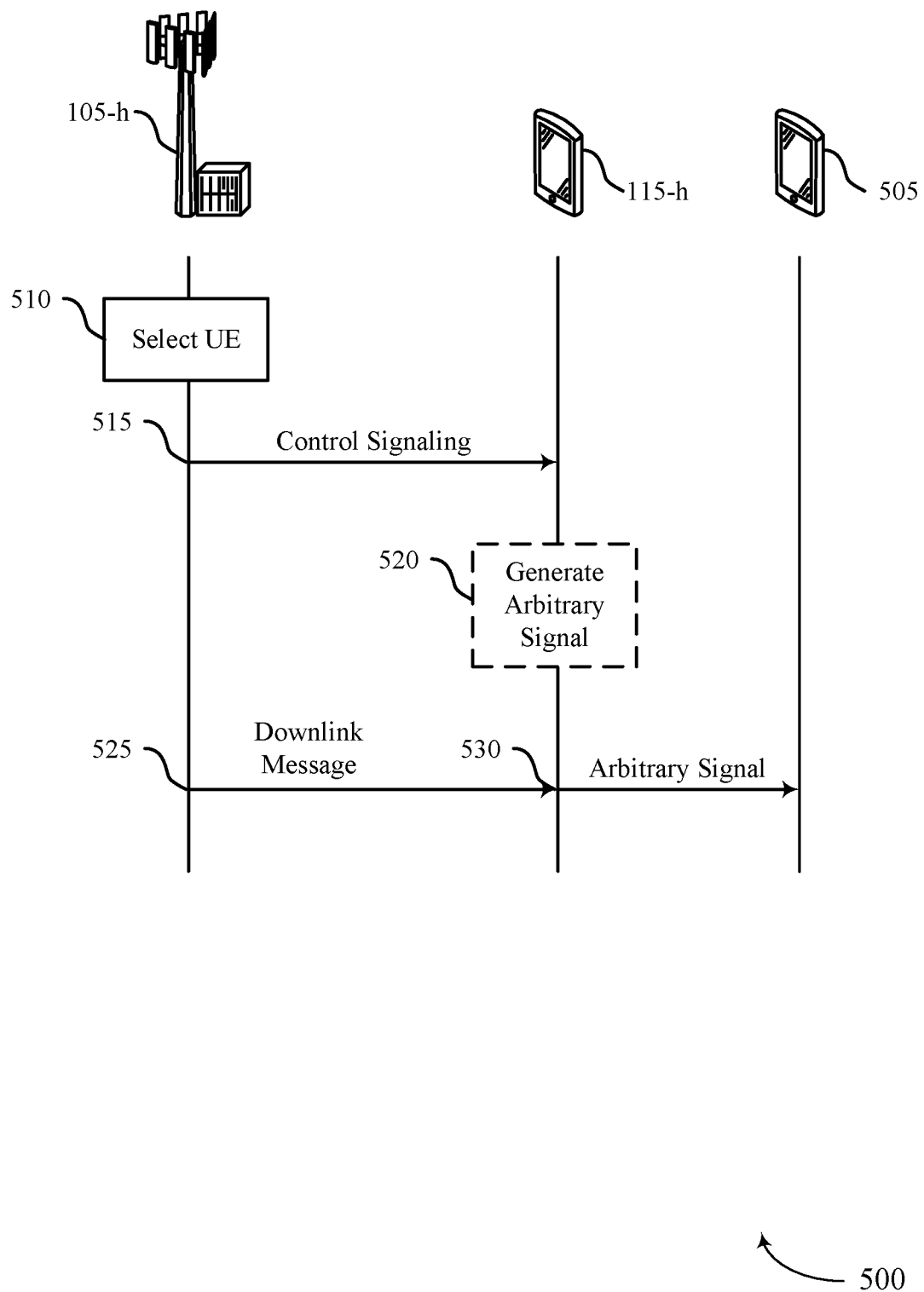
FIG. 5 illustrates an example of a process flow that supports full-duplex communications and physical layer security in accordance with aspects of the present disclosure.

FIG. 5 illustrates an example of a process flow 500 that supports multiple thresholds for unlicensed channel access for full-duplex nodes in accordance with aspects of the present disclosure. In some examples, process flow 500 may implement aspects of or may be implemented by aspects of wireless communications system 100, wireless communications system 200, or both. For example, process flow 500 may include a base station 105-*h* and a UE 115-*h*, which may represent examples of corresponding base stations 105 and UEs 115, respectively, as described with reference to FIGS. 1-4. Additionally, process flow 500 may include an adverse device 505, which may represent an example of an adverse wireless communications device as described with reference to FIGS. 1-4. In some examples, base station 105-*h*, UE 115-*h*, or both may be referred to as a full-duplex device, a full-duplex wireless device, a full-duplex node, or a similar type of device that support full-duplex communications.

In the following description of process flow 500, the operations between UE 115-*h*, base station 105-*h*, and adverse device 505 may be performed in different orders or at different times. Certain operations may also be left out of process flow 500, or other operations may be added to process flow 500. It is to be understood that while UE 115-*h* and base station 105-*h* are shown performing a number of the operations of process flow 500, any device or wireless device may perform the operations shown.

At 510, base station 105-*h* (e.g., a transmitting device) may select UE 115-*h* (e.g., a receiving device) to receive a downlink message (e.g., as described with reference to FIG. 2 with the downlink message 215). UE 115-*h* may be capable of full-duplex operations (e.g., capable of concurrent reception and transmission). Base station 105-*h* may select UE 115-*h* to receive the downlink message from multiple possible devices. In some examples, base station 105-*h* may also determine that the adverse device 505 is nearby or in close proximity to UE 115-*h*.

At 515, base station 105-*h* may transmit control signaling to UE 115-*h* indicating for UE 115-*h* to transmit a message on time and frequency resources that at least partially overlap with resources for receiving the downlink message from base station 105-*h*. In some examples, the control signaling may indicate that the message is to include a set of arbitrary bits (e.g., similar to the arbitrary signal 225 as described with reference to FIG. 2). Additionally, the control signaling may contain configuration information that enables UE 115-*h* to transmit the message containing the set of arbitrary bits. For example, the configuration information may at least indicate for UE 115-*h* to transmit the message in a direction of the adverse device 505, where the message is transmitted on at least partially overlapping resources as the resources used for receiving the downlink message. In some examples, the control signaling indicating for UE 115-*h* to transmit the message may be different than other control signaling indicating for UE 115-*h* to transmit an uplink message to base station 105-*h*.

In some examples, base station 105-*h* may indicate for UE 115-*h* to transmit the message on the at least partially overlapping resources used for receiving the downlink message based on determining that the adverse device 505 is nearby or in close proximity to UE 115-*h*. Additionally or alternatively, base station 105-*h* may indicate for UE 115-*h* to transmit the message on the at least partially overlapping resources used for receiving the downlink message based on UE 115-*h* being capable of full-duplex operations.

The control signaling received at 515 may contain configuration information for UE 115-*h* to receive the downlink message, to transmit the message including the set of arbitrary bits, or both. In some examples, with the control signaling, base station 105-*h* may configure UE 115-*h* to transmit the message including the set of arbitrary bits via dynamic scheduling, an uplink configured grant, an uplink configured grant linked to every downlink transmission, or any combination thereof. For example, UE 115-*h* may receive the control signaling indicating a dynamic grant scheduling the downlink message, the uplink message, or a combination thereof (e.g., dynamic scheduling). Additionally or alternatively, UE 115-*h* may receive the control signaling indicating a configured grant scheduling the downlink message, the uplink message, or a combination thereof (e.g., the uplink configured grant). In some examples, the configured grant may indicate that the message including the set of arbitrary bits is linked to the downlink message (e.g., the uplink configured grant linked to every downlink transmission).

In some examples, the control signaling may further indicate configuration information for enabling UE 115-*h* to transmit the message that contains the set of arbitrary bits. For example, the control signaling may include an indication of a size of the message that contains the set of arbitrary bits. Because the message is randomly generated and sending no actual information, the size of the arbitrary signal may be specified. In some examples, the control signaling may first include a number of sizes for the message via RRC signaling. Additionally, the control signaling may then include a size selected from the number of sizes for the message via DCI. In some examples, the control signaling may also include an indication of a number of bits to be generated for the message including the set of arbitrary bits. For example, UE 115-*h* may generate a number of bits for the message including the set of arbitrary bits based on available network resources for transmission and other transmission parameters, such as an MCS.

Additionally, UE 115-*h* may receive the control signaling from base station 105-*h* indicating one or more transmission parameters for transmitting the message including the set of arbitrary bits. For example, the one or more transmission parameters may include a transmission beam for transmitting the message, an MCS for transmitting the message, power control information for transmitting the message, or a combination thereof. In some examples, the control signaling may include a bit that activates UE 115-*h* to transmit the message (e.g., in a DCI message used to schedule the downlink message). That is, base station 105-*h* may transmit the control signaling to UE 115-*h* indicating UE 115-*h* is to transmit the message including the set of arbitrary bits.

At 520, the UE 115-*h* may generate an arbitrary signal (e.g., the set of arbitrary bits) to transmit as the message in the direction of the adverse device 505. For example, the arbitrary signal may convey no actual information but rather may include a random sequence of bits with a selected length (e.g., the number of bits generated is determined from the control signaling sent from base station 105-*h* at 515). In some examples, UE 115-*h* may generate the arbitrary signal based on the time and frequency resources configured for the downlink message, such that the arbitrary signal and the downlink message are communicated on at least partially overlapping resources.

At 525, base station 105-*h* may transmit the downlink message to UE 115-*h* on a first set of time and frequency resources (e.g., configured by base station 105-*h* and conveyed in the control signaling at 515). However, the adverse device 505 may attempt to access the transmission of the downlink message by attempting to access the transmission resources for the downlink message to learn secure or confidential information about UE 115-*h* or about the data sent in the downlink message.

At 530, UE 115-*h* may transmit the message including the set of arbitrary bits in a direction of the adverse device 505. For example, UE 115-*h* may transmit the message on a second set of time and frequency resources that at least partially overlap with the first set of time and frequency resources used for receiving the downlink message (e.g., the message may overlap at least in part with the downlink transmission, in time and/or frequency resources). In some examples, UE 115-*h* may transmit the message in a direction configured by base station 105-*h* (e.g., based on an indication of a transmit beam for UE 115-*h* to use), where the direction corresponds to the adverse device 505 that is geographically located nearby UE 115-*h*. Additionally, base station 105-*h* may configure UE 115-*h* to transmit a sequence generated with random parameters, a PUCCH message, a PUSCH message, or a combination thereof for transmitting the message including the set of arbitrary bits.

In some examples, UE 115-*h* may receive an indication from base station 105-*h* to transmit the message including the set of arbitrary bits, at least partially, in response to receiving an indication of the incoming downlink message. For example, base station 105-*h* may transmit an indication of the time and frequency resources that will be used for the downlink transmission, and UE 115-*h* may transmit the message including the set of arbitrary bits in the direction of the adverse device 505 based on receiving the indication from base station 105-*h*.

When transmitting the message including the set of arbitrary bits in the direction of the adverse device 505, UE 115-*h* may detect self-interference and adjust a number of overlapping resources to accommodate for receiving the downlink message from base station 105-*h* and mitigating the self-interference. For example, UE 115-*h* may determine an amount of overlap between the time and frequency resources used for receiving the downlink message and the time and frequency resources for transmitting the message including the set of arbitrary bits based on an amount of self-interference experienced at UE 115-*h*. In some examples, UE 115-*h* may adjust the amount of overlap based on the amount of self-interference. Additionally, UE 115-*h* may transmit a signal to base station 105-*h* indicating an amount of overlap between the message including the set of arbitrary bits and the downlink message. In some examples, UE 115-*h* may receive, from base station 105-*h*, an indication of a self-interference threshold that may be used by UE 115-*h*, in part, to determine the amount of overlap.

Additionally or alternatively, base station 105-*h* may determine the amount of overlap between the time and frequency resources used by UE 115-*h* for receiving the downlink message and the time and frequency resources used by UE 115-*h* for transmitting the message including the set of arbitrary bits based on an amount of self-interference experienced at UE 115-*h*. For example, base station 105-*h* may adjust the amount of overlap based on the amount of self-interference experienced at UE 115-*h*. In some examples, base station 105-*h* may transmit an indication of the amount of overlap between the time and frequency resources used by UE 115-*h* for receiving the downlink message and the time and frequency resources used by UE 115-*h* for transmitting the message including the set of arbitrary bits.

Figure 6:
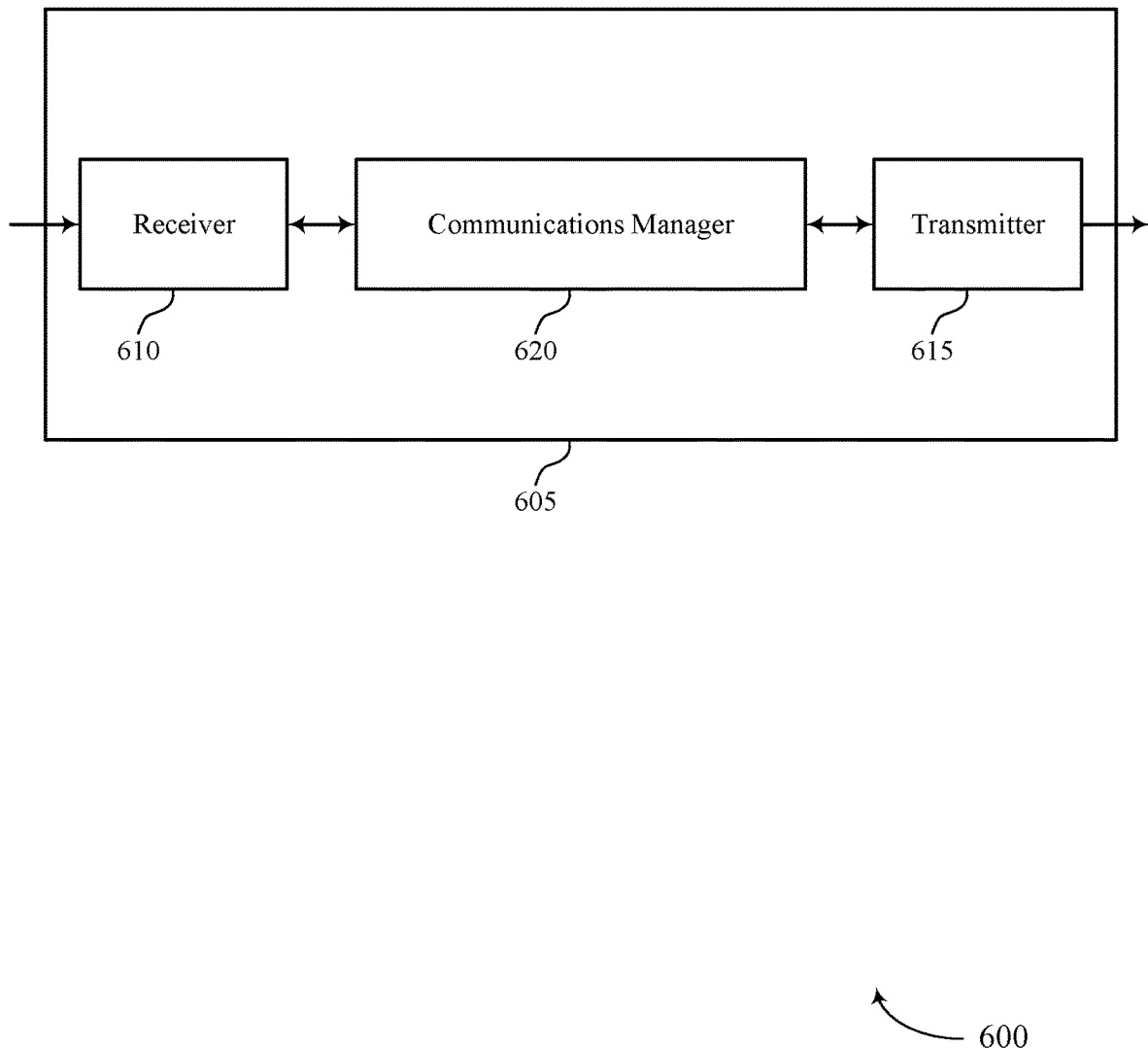
FIGS. 6 and 7 show block diagrams of devices that support full-duplex communications and physical layer security in accordance with aspects of the present disclosure.

FIG. 6 shows a block diagram 600 of a device 605 that supports full-duplex communications and physical layer security in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to full-duplex communications and physical layer security). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to full-duplex communications and physical layer security). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of full-duplex communications and physical layer security as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The communications manager 620 may be configured as or otherwise support a means for receiving, from the base station and according to the control signaling, the downlink message on a first set of time and frequency resources. The communications manager 620 may be configured as or otherwise support a means for transmitting, to a device and based on the control signaling, the message including the set of arbitrary bits on a second set of time and frequency resources that at least partially overlap with the first set of time and frequency resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved communication reliability and enhanced security. For example, by transmitting a message that contains arbitrary or random information in the direction of a possible adverse device, the device 605 may securely receive a downlink transmission with a lesser chance that the possible adverse device detects and receives the downlink transmission.

Figure 7:
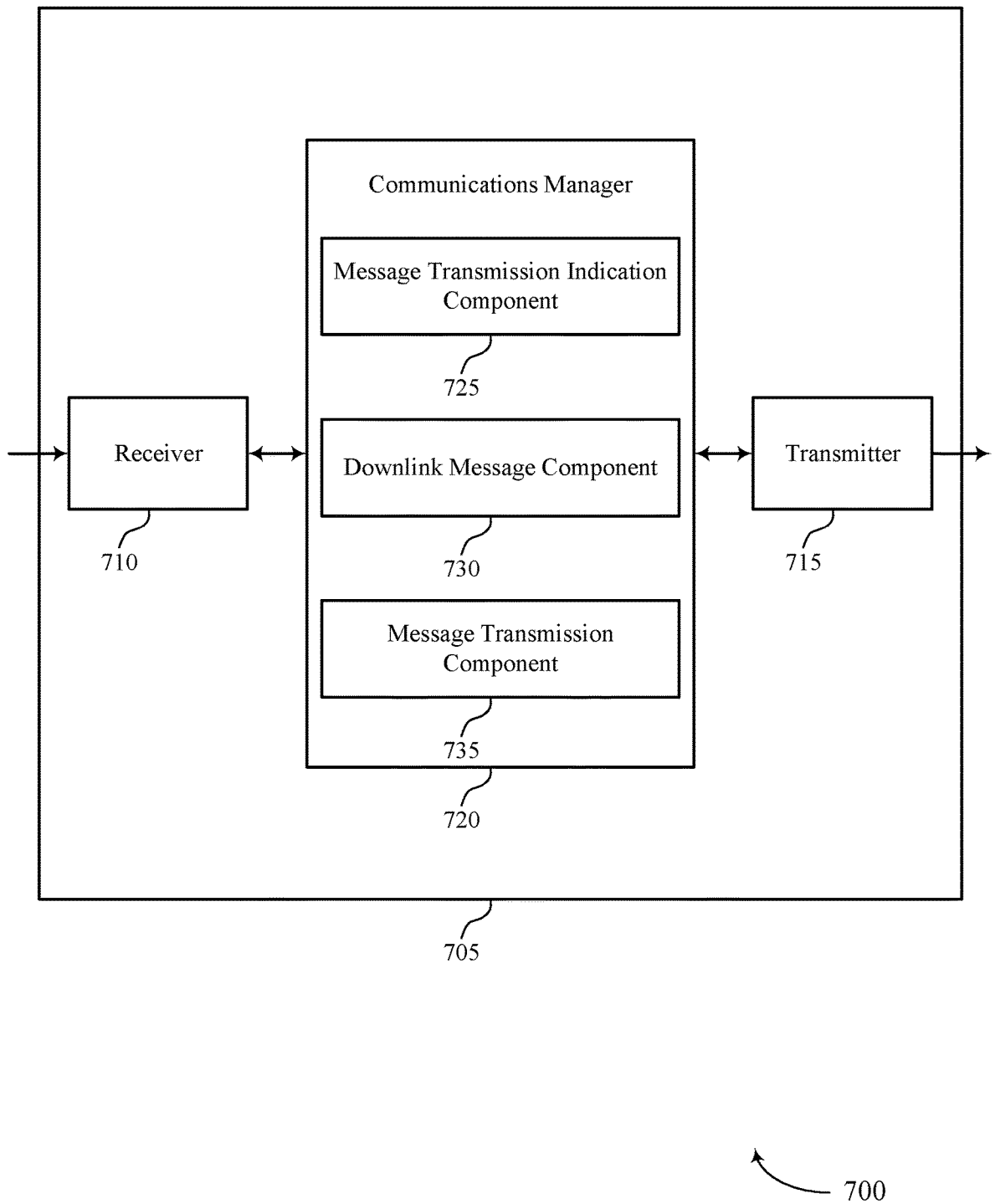

FIG. 7 shows a block diagram 700 of a device 705 that supports full-duplex communications and physical layer security in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to full-duplex communications and physical layer security). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to full-duplex communications and physical layer security). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of full-duplex communications and physical layer security as described herein. For example, the communications manager 720 may include a message transmission indication component 725, a downlink message component 730, a message transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The message transmission indication component 725 may be configured as or otherwise support a means for receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The downlink message component 730 may be configured as or otherwise support a means for receiving, from the base station and according to the control signaling, the downlink message on a first set of time and frequency resources. The message transmission component 735 may be configured as or otherwise support a means for transmitting, to a device and based on the control signaling, the message including the set of arbitrary bits on a second set of time and frequency resources that at least partially overlap with the first set of time and frequency resources.

Figure 8:
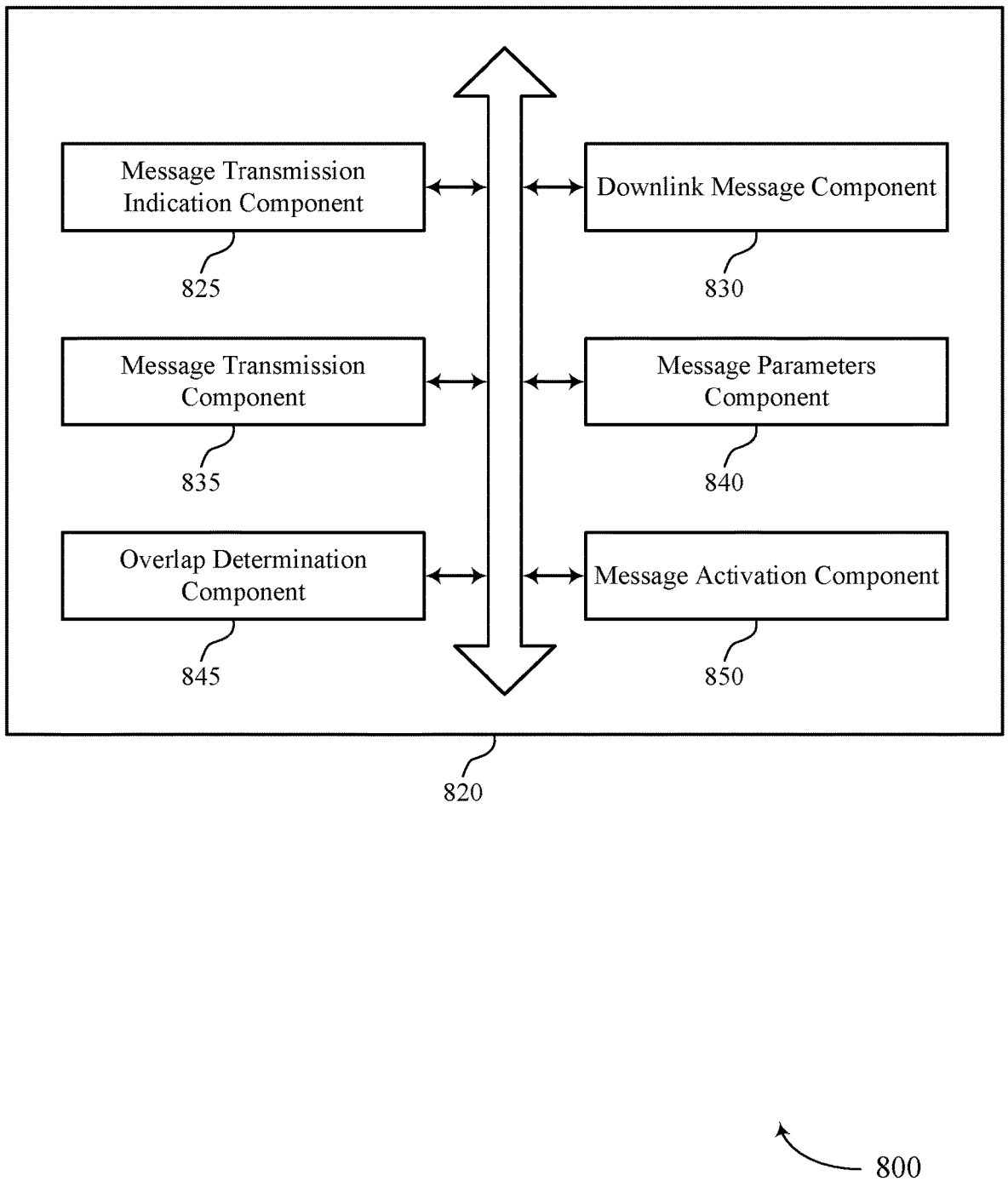
FIG. 8 shows a block diagram of a communications manager that supports full-duplex communications and physical layer security in accordance with aspects of the present disclosure.

FIG. 8 shows a block diagram 800 of a communications manager 820 that supports full-duplex communications and physical layer security in accordance with aspects of the present disclosure. The communications manager 820 may be an example of aspects of a communications manager 620, a communications manager 720, or both, as described herein. The communications manager 820, or various components thereof, may be an example of means for performing various aspects of full-duplex communications and physical layer security as described herein. For example, the communications manager 820 may include a message transmission indication component 825, a downlink message component 830, a message transmission component 835, a message parameters component 840, an overlap determination component 845, a message activation component 850, or any combination thereof. Each of these components may communicate, directly or indirectly, with one another (e.g., via one or more buses).

The communications manager 820 may support wireless communications at a UE in accordance with examples as disclosed herein. The message transmission indication component 825 may be configured as or otherwise support a means for receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The downlink message component 830 may be configured as or otherwise support a means for receiving, from the base station and according to the control signaling, the downlink message on a first set of time and frequency resources. The message transmission component 835 may be configured as or otherwise support a means for transmitting, to a device and based on the control signaling, the message including the set of arbitrary bits on a second set of time and frequency resources that at least partially overlap with the first set of time and frequency resources.

In some examples, to support receiving the control signaling, the message transmission indication component 825 may be configured as or otherwise support a means for receiving a dynamic grant scheduling the downlink message, the message, or both.

In some examples, to support receiving the control signaling, the message transmission indication component 825 may be configured as or otherwise support a means for receiving a configured grant scheduling the downlink message, the message, or both. In some examples, the configured grant indicates that the message may be linked to the downlink message.

In some examples, to support receiving the control signaling, the message transmission indication component 825 may be configured as or otherwise support a means for receiving the control signaling including an indication of a size of the message. In some examples, the message transmission indication component 825 may be configured as or otherwise support a means for receiving a first indication of a set of multiple sizes for the message via RRC signaling. In some examples, the message transmission indication component 825 may be configured as or otherwise support a means for receiving a second indication of a first size of the set of multiple sizes for the message via DCI.

In some examples, the message transmission component 835 may be configured as or otherwise support a means for generating a number of bits for the set of arbitrary bits to transmit in the message based on one or more transmission parameters for the message, where transmitting the message is based on generating the number of bits for the set of arbitrary bits. In some examples, the one or more transmission parameters for the message may include a number of available resources for the message, an MCS, or both.

In some examples, to support transmitting the message, the message transmission component 835 may be configured as or otherwise support a means for transmitting a sequence generated with random parameters, a PUCCH message, a PUSCH message, or a combination thereof.

In some examples, to support receiving the control signaling, the message parameters component 840 may be configured as or otherwise support a means for receiving one or more transmission parameters for transmitting the message. In some examples, the one or more transmission parameters include a transmission beam for transmitting the message, an MCS for transmitting the message, power control information for transmitting the message, or a combination thereof.

In some examples, the overlap determination component 845 may be configured as or otherwise support a means for determining an amount of overlap between the first set of time and frequency resources and the second set of time and frequency resources based on an amount of self-interference experienced at the UE. In some examples, the overlap determination component 845 may be configured as or otherwise support a means for receiving, from the base station, an indication including the amount of overlap. In some examples, the overlap determination component 845 may be configured as or otherwise support a means for transmitting, to the base station, an indication including the amount of overlap. In some examples, the overlap determination component 845 may be configured as or otherwise support a means for receiving, from the base station, an indication including a self-interference threshold, where the amount of overlap is determined based on the self-interference threshold.

In some examples, to support receiving the control signaling, the message activation component 850 may be configured as or otherwise support a means for receiving the control signaling including a bit activating the message in a DCI message scheduling the downlink message.

In some examples, the downlink message component 830 may be configured as or otherwise support a means for receiving, from the base station, an indication for the UE to receive the downlink message on the first set of time and frequency resources, where transmitting the message is based on receiving the indication for the UE to receive the downlink message. In some examples, the control signaling indicating for the UE to transmit the message is different than other control signaling indicating for the UE to transmit an uplink message to the base station.

Figure 9:
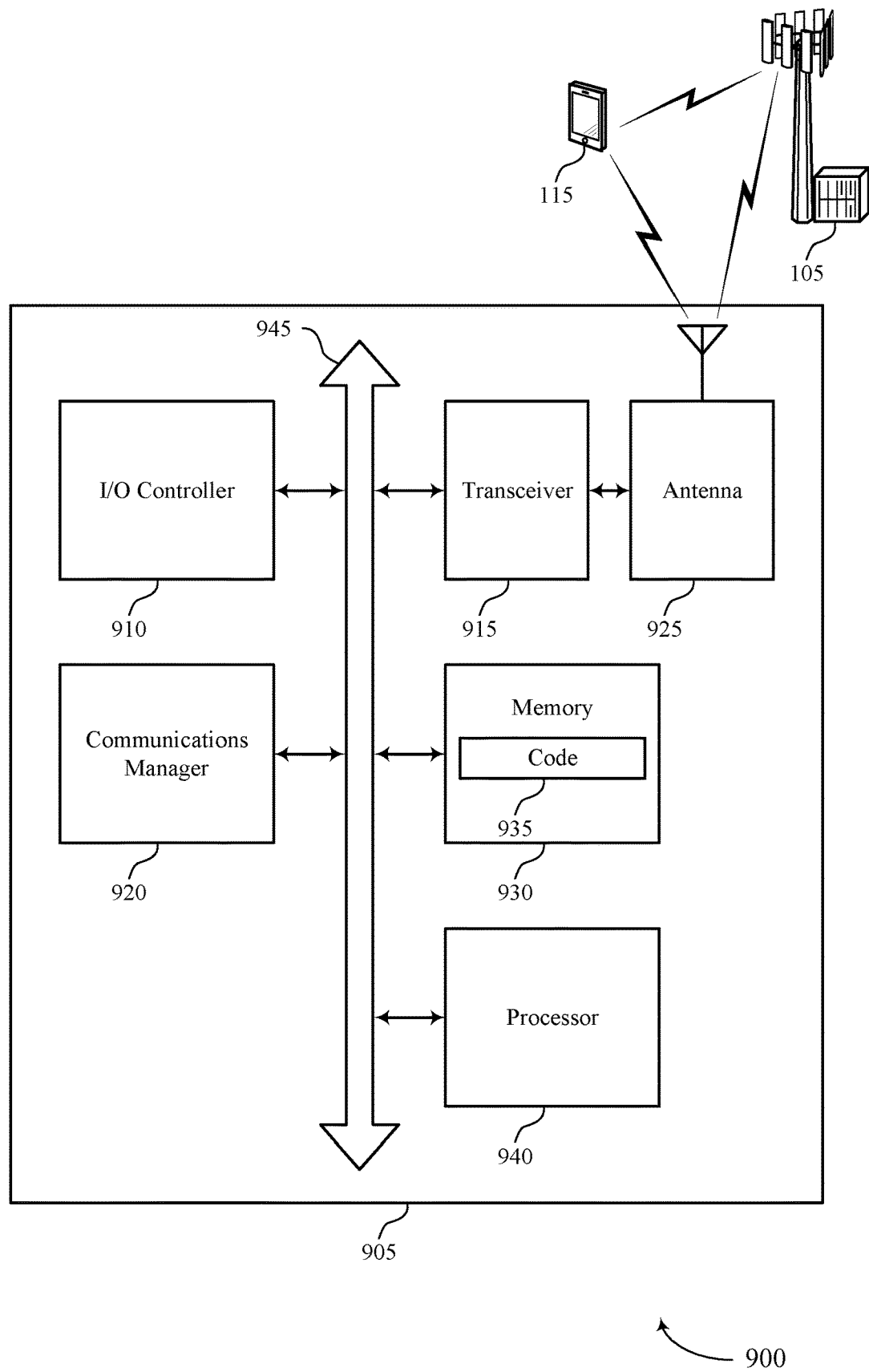
FIG. 9 shows a diagram of a system including a device that supports full-duplex communications and physical layer security in accordance with aspects of the present disclosure.

FIG. 9 shows a diagram of a system 900 including a device 905 that supports full-duplex communications and physical layer security in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting full-duplex communications and physical layer security). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The communications manager 920 may be configured as or otherwise support a means for receiving, from the base station and according to the control signaling, the downlink message on a first set of time and frequency resources. The communications manager 920 may be configured as or otherwise support a means for transmitting, to a device and based on the control signaling, the message including the set of arbitrary bits on a second set of time and frequency resources that at least partially overlap with the first set of time and frequency resources.

By including or configuring the communications manager 920 in accordance with examples as described herein, the device 905 may support techniques for improved communication reliability and enhanced security. For example, by transmitting a message that contains arbitrary or random information in the direction of a possible adverse device, the device 605 may securely receive a downlink transmission with a lesser chance that the possible adverse device detects and receives the downlink transmission.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of full-duplex communications and physical layer security as described herein, or the processor 940 and the memory 930 may be otherwise configured to perform or support such operations.

Figure 10:
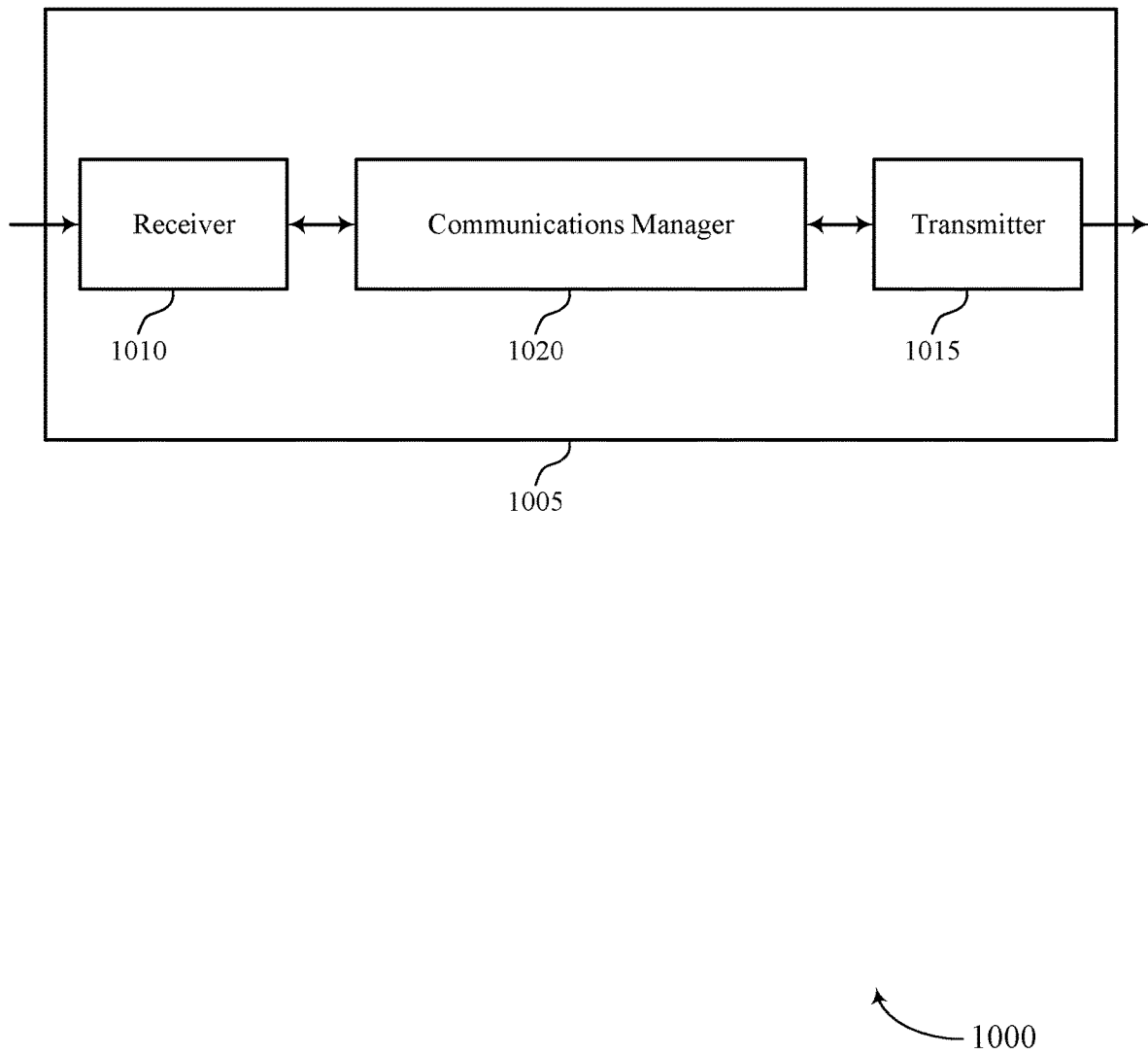
FIGS. 10 and 11 show block diagrams of devices that support full-duplex communications and physical layer security in accordance with aspects of the present disclosure.

FIG. 10 shows a block diagram 1000 of a device 1005 that supports full-duplex communications and physical layer security in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to full-duplex communications and physical layer security). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to full-duplex communications and physical layer security). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of full-duplex communications and physical layer security as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for selecting a UE for receiving a downlink message from the base station based on the UE being capable of concurrent reception and transmission in a full-duplex mode. The communications manager 1020 may be configured as or otherwise support a means for transmitting, to the UE, control signaling indicating for the UE to transmit a message, to a device, on time and frequency resources that at least partially overlap with resources for the downlink message, the control signaling indicating that the message is to include a set of arbitrary bits. The communications manager 1020 may be configured as or otherwise support a means for transmitting, to the UE and according to the control signaling, the downlink message on a first set of time and frequency resources that at least partially overlap with the resources for the downlink message.

Figure 11:
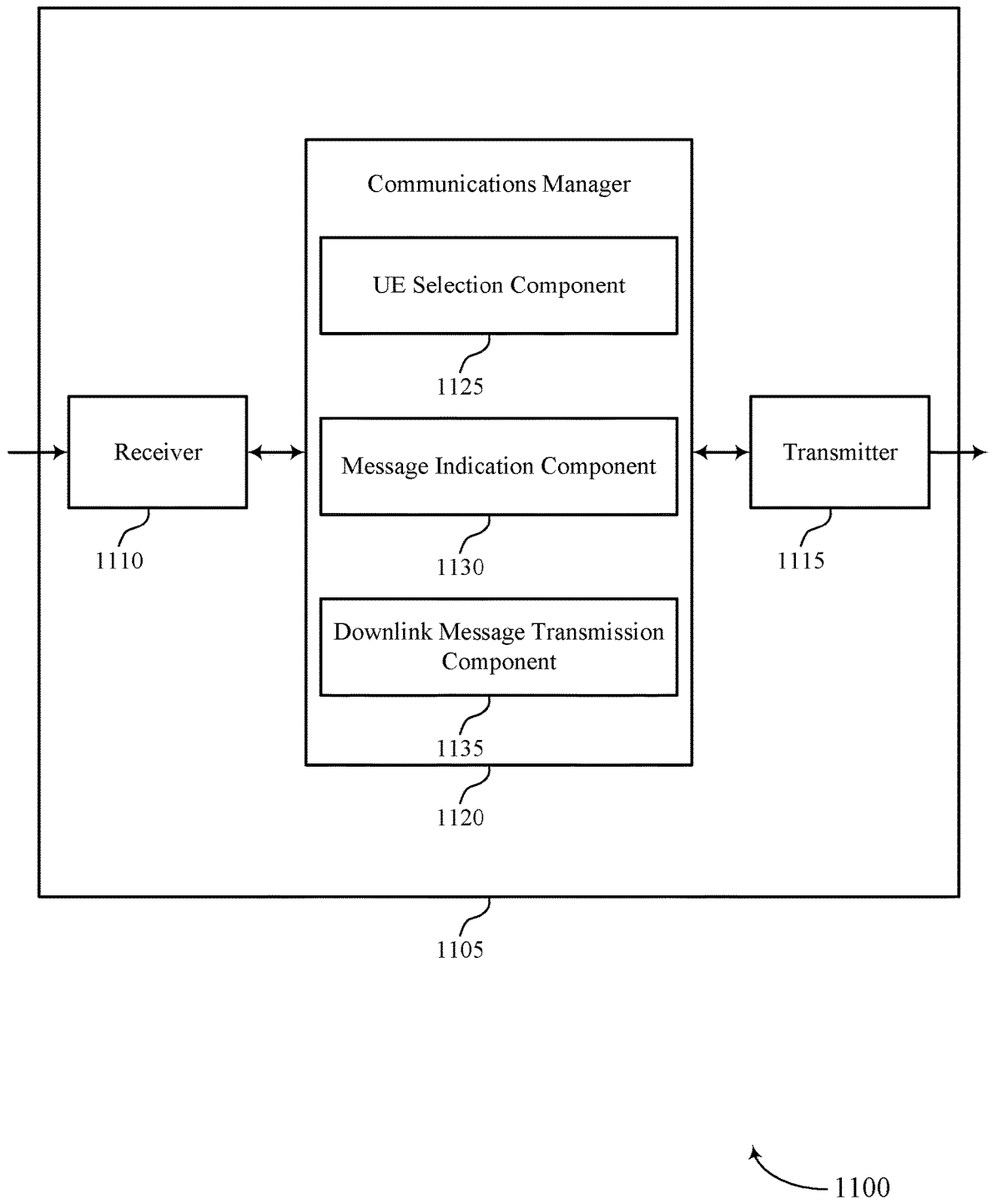

FIG. 11 shows a block diagram 1100 of a device 1105 that supports full-duplex communications and physical layer security in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to full-duplex communications and physical layer security). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to full-duplex communications and physical layer security). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of full-duplex communications and physical layer security as described herein. For example, the communications manager 1120 may include a UE selection component 1125, a message indication component 1130, a downlink message transmission component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The UE selection component 1125 may be configured as or otherwise support a means for selecting a UE for receiving a downlink message from the base station based on the UE being capable of concurrent reception and transmission in a full-duplex mode. The message indication component 1130 may be configured as or otherwise support a means for transmitting, to the UE, control signaling indicating for the UE to transmit a message, to a device, on time and frequency resources that at least partially overlap with resources for the downlink message, the control signaling indicating that the message is to include a set of arbitrary bits. The downlink message transmission component 1135 may be configured as or otherwise support a means for transmitting, to the UE and according to the control signaling, the downlink message on a first set of time and frequency resources that at least partially overlap with the resources for the downlink message.

Figure 12:
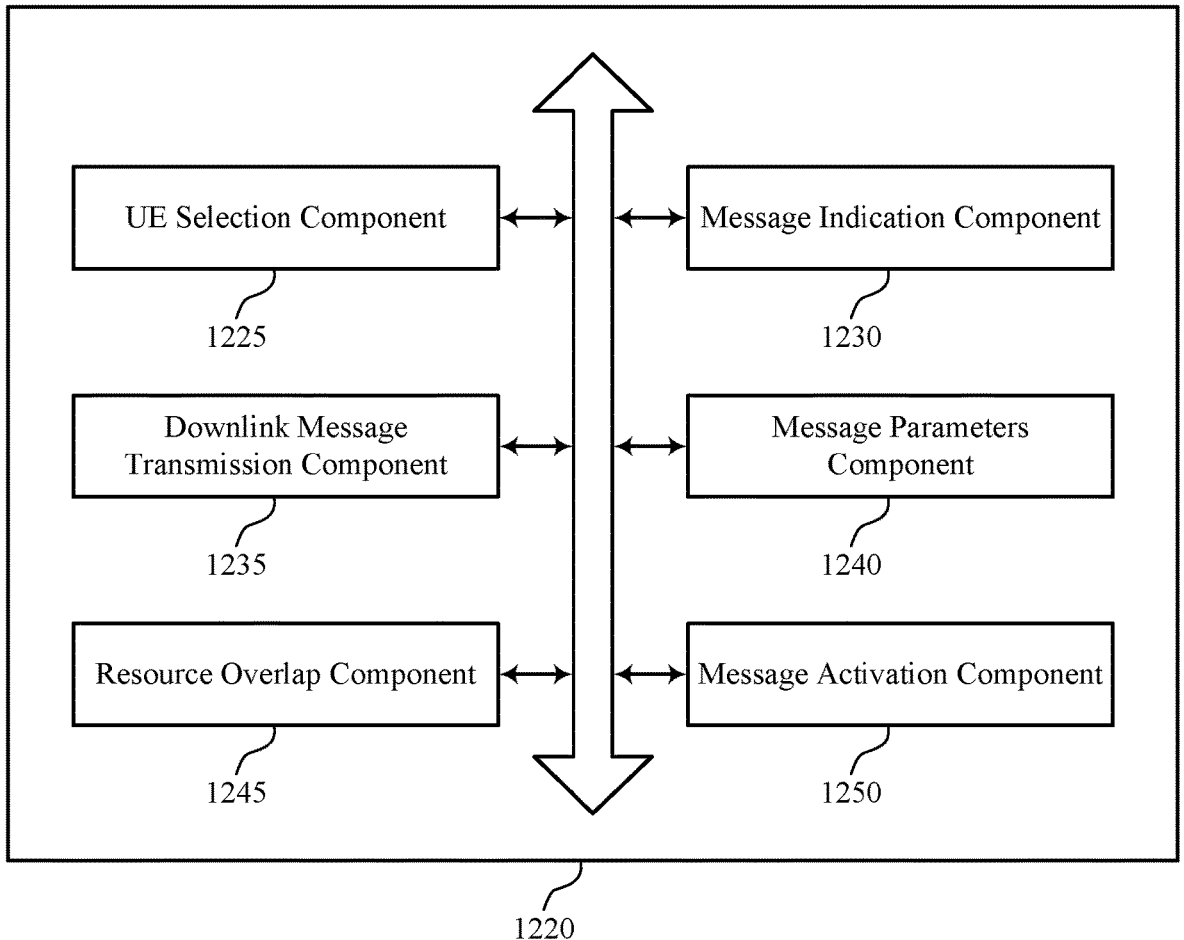
FIG. 12 shows a block diagram of a communications manager that supports full-duplex communications and physical layer security in accordance with aspects of the present disclosure.

FIG. 12 shows a block diagram 1200 of a communications manager 1220 that supports full-duplex communications and physical layer security in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of full-duplex communications and physical layer security as described herein. For example, the communications manager 1220 may include a UE selection component 1225, a message indication component 1230, a downlink message transmission component 1235, a message parameters component 1240, a resource overlap component 1245, a message activation component 1250, or any combination thereof. Each of these components may communicate, directly or indirectly, with one another (e.g., via one or more buses).

The communications manager 1220 may support wireless communications at a base station in accordance with examples as disclosed herein. The UE selection component 1225 may be configured as or otherwise support a means for selecting a UE for receiving a downlink message from the base station based on the UE being capable of concurrent reception and transmission in a full-duplex mode. The message indication component 1230 may be configured as or otherwise support a means for transmitting, to the UE, control signaling indicating for the UE to transmit a message, to a device, on time and frequency resources that at least partially overlap with resources for the downlink message, the control signaling indicating that the message is to include a set of arbitrary bits. The downlink message transmission component 1235 may be configured as or otherwise support a means for transmitting, to the UE and according to the control signaling, the downlink message on a first set of time and frequency resources that at least partially overlap with the resources for the downlink message.

In some examples, to support transmitting the control signaling, the message indication component 1230 may be configured as or otherwise support a means for transmitting a dynamic grant scheduling the downlink message, the message, or both.

In some examples, to support transmitting the control signaling, the message indication component 1230 may be configured as or otherwise support a means for transmitting a configured grant scheduling the downlink message, the message, or both. In some examples, the configured grant indicates the message may be linked to the downlink message.

In some examples, to support transmitting the control signaling, the message indication component 1230 may be configured as or otherwise support a means for transmitting the control signaling including an indication of a size of the message. In some examples, the message indication component 1230 may be configured as or otherwise support a means for transmitting a first indication of a set of multiple sizes for the message via RRC signaling. In some examples, the message indication component 1230 may be configured as or otherwise support a means for transmitting a second indication of a first size of the set of multiple sizes for the message via DCI.

In some examples, to support transmitting the control signaling, the message parameters component 1240 may be configured as or otherwise support a means for transmitting one or more transmission parameters for the UE to transmit the message. In some examples, the one or more transmission parameters include a transmission beam for transmitting the message, an MCS for transmitting the message, power control information for transmitting the message, or a combination thereof.

In some examples, the resource overlap component 1245 may be configured as or otherwise support a means for determining an amount of overlap between the first set of time and frequency resources and a second set of time and frequency resources based on an amount of self-interference experienced at the UE. In some examples, the resource overlap component 1245 may be configured as or otherwise support a means for transmitting, to the UE, an indication including the amount of overlap. In some examples, the resource overlap component 1245 may be configured as or otherwise support a means for receiving, from the UE, an indication including the amount of overlap. In some examples, the resource overlap component 1245 may be configured as or otherwise support a means for transmitting, to the UE, an indication including a self-interference threshold, where the amount of overlap is determined based on the self-interference threshold.

In some examples, to support transmitting the control signaling, the message activation component 1250 may be configured as or otherwise support a means for transmitting the control signaling including a bit activating the message in a DCI message scheduling the downlink message.

In some examples, to support selecting the UE, the UE selection component 1225 may be configured as or otherwise support a means for selecting the UE based on the UE being in proximity to a second UE.

In some examples, the message indication component 1230 may be configured as or otherwise support a means for transmitting, to the UE, an indication for the UE to receive the downlink message on the first set of time and frequency resources, where receiving the message is based on transmitting the indication for the UE to receive the downlink message. In some examples, the control signaling indicating for the UE to transmit the message is different than other control signaling indicating for the UE to transmit an uplink message to the base station.

Figure 13:
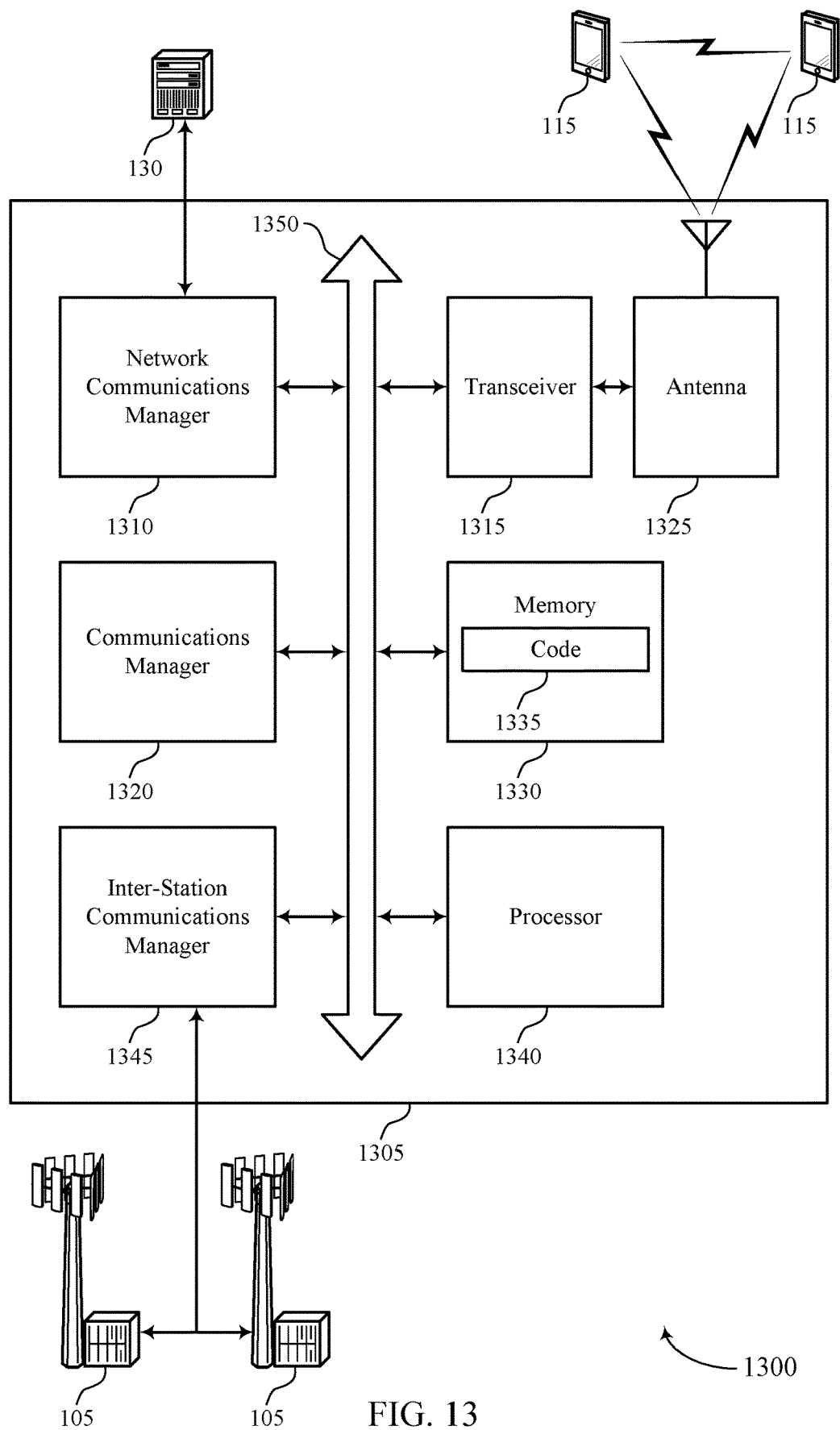
FIG. 13 shows a diagram of a system including a device that supports full-duplex communications and physical layer security in accordance with aspects of the present disclosure.

FIG. 13 shows a diagram of a system 1300 including a device 1305 that supports full-duplex communications and physical layer security in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting full-duplex communications and physical layer security). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for selecting a UE for receiving a downlink message from the base station based on the UE being capable of concurrent reception and transmission in a full-duplex mode. The communications manager 1320 may be configured as or otherwise support a means for transmitting, to the UE, control signaling indicating for the UE to transmit a message, to a device, on time and frequency resources that at least partially overlap with resources for the downlink message, the control signaling indicating that the message is to include a set of arbitrary bits. The communications manager 1320 may be configured as or otherwise support a means for transmitting, to the UE and according to the control signaling, the downlink message on a first set of time and frequency resources that at least partially overlap with the resources for the downlink message.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of full-duplex communications and physical layer security as described herein, or the processor 1340 and the memory 1330 may be otherwise configured to perform or support such operations.

Figure 14:
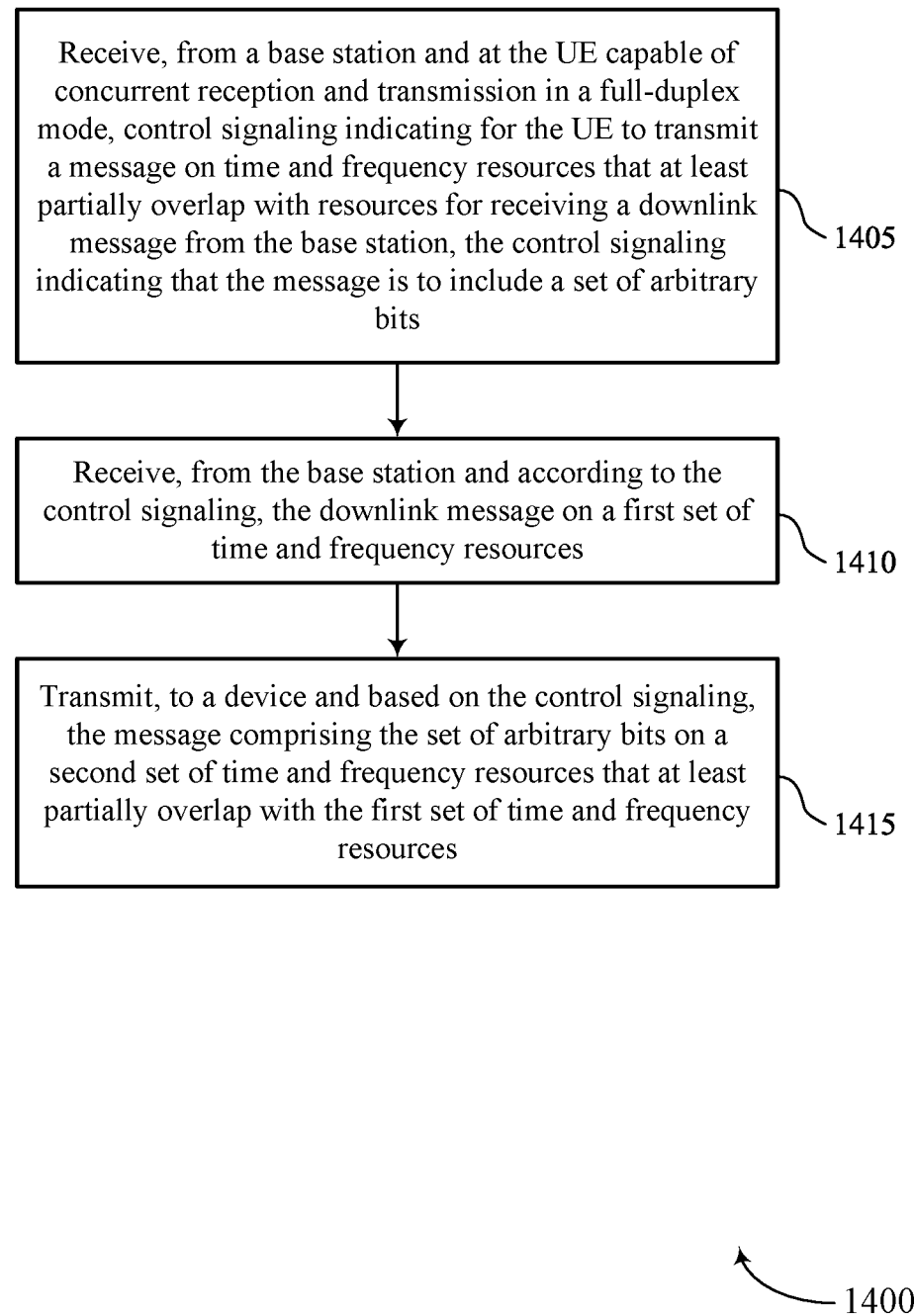
FIGS. 14 through 21 show flowcharts illustrating methods that support full-duplex communications and physical layer security in accordance with aspects of the present disclosure.

FIG. 14 shows a flowchart illustrating a method 1400 that supports full-duplex communications and physical layer security in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1405 may be performed in accordance with examples as disclosed herein. In some examples, aspects of the operations of 1405 may be performed by a message transmission indication component 825 as described with reference to FIG. 8.

At 1410, the method may include receiving, from the base station and according to the control signaling, the downlink message on a first set of time and frequency resources. The operations of 1410 may be performed in accordance with examples as disclosed herein. In some examples, aspects of the operations of 1410 may be performed by a downlink message component 830 as described with reference to FIG. 8.

At 1415, the method may include transmitting, to a device and based on the control signaling, the message including the set of arbitrary bits on a second set of time and frequency resources that at least partially overlap with the first set of time and frequency resources. The operations of 1415 may be performed in accordance with examples as disclosed herein. In some examples, aspects of the operations of 1415 may be performed by a message transmission component 835 as described with reference to FIG. 8.

Figure 15:
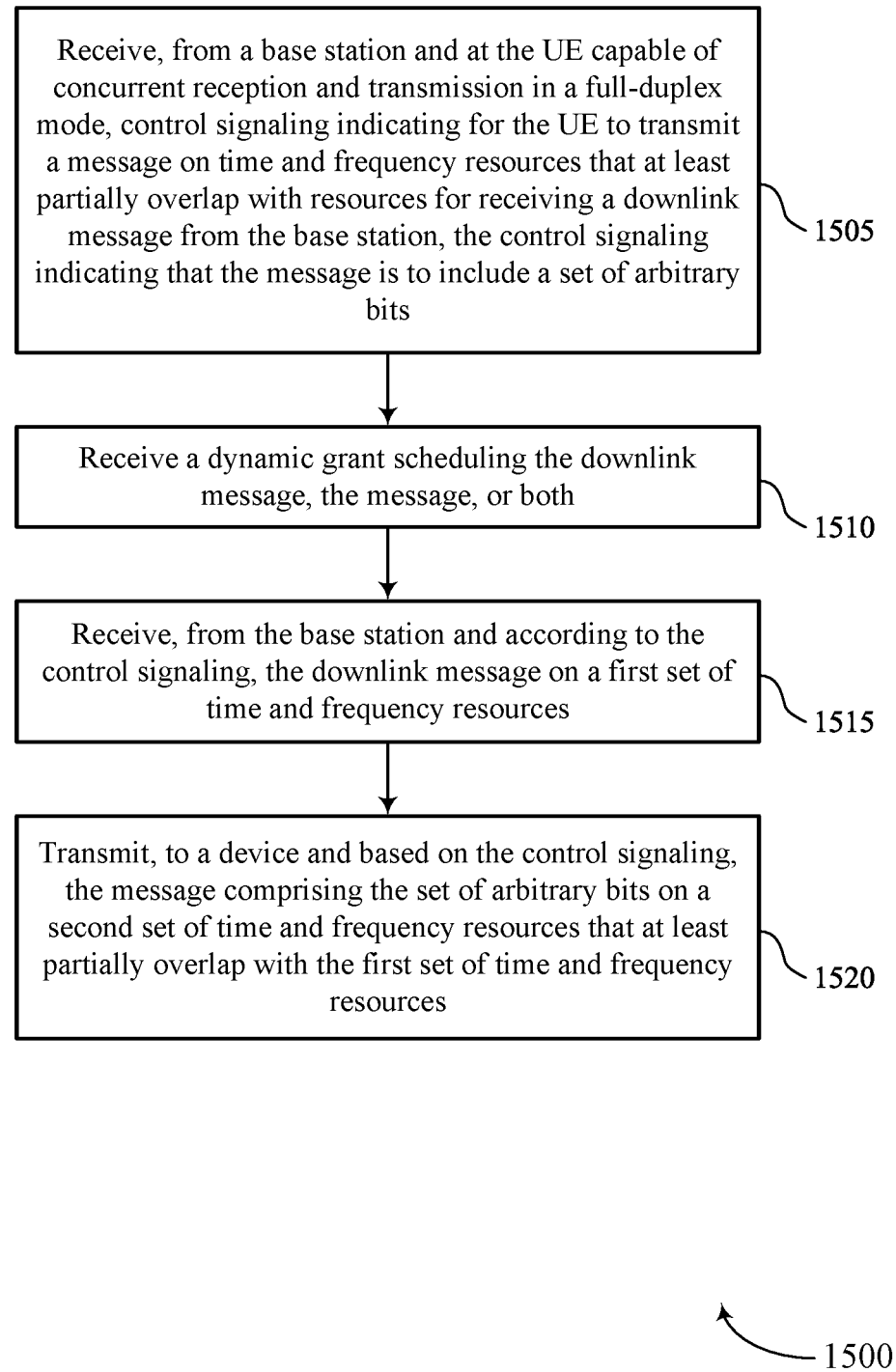

FIG. 15 shows a flowchart illustrating a method 1500 that supports full-duplex communications and physical layer security in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1505 may be performed in accordance with examples as disclosed herein. In some examples, aspects of the operations of 1505 may be performed by a message transmission indication component 825 as described with reference to FIG. 8.

At 1510, the method may include receiving a dynamic grant scheduling the downlink message, the message, or both. The operations of 1510 may be performed in accordance with examples as disclosed herein. In some examples, aspects of the operations of 1510 may be performed by a message transmission indication component 825 as described with reference to FIG. 8.

At 1515, the method may include receiving, from the base station and according to the control signaling, the downlink message on a first set of time and frequency resources. The operations of 1515 may be performed in accordance with examples as disclosed herein. In some examples, aspects of the operations of 1515 may be performed by a downlink message component 830 as described with reference to FIG. 8.

At 1520, the method may include transmitting, to a device and based on the control signaling, the message including the set of arbitrary bits on a second set of time and frequency resources that at least partially overlap with the first set of time and frequency resources. The operations of 1520 may be performed in accordance with examples as disclosed herein. In some examples, aspects of the operations of 1520 may be performed by a message transmission component 835 as described with reference to FIG. 8.

Figure 16:
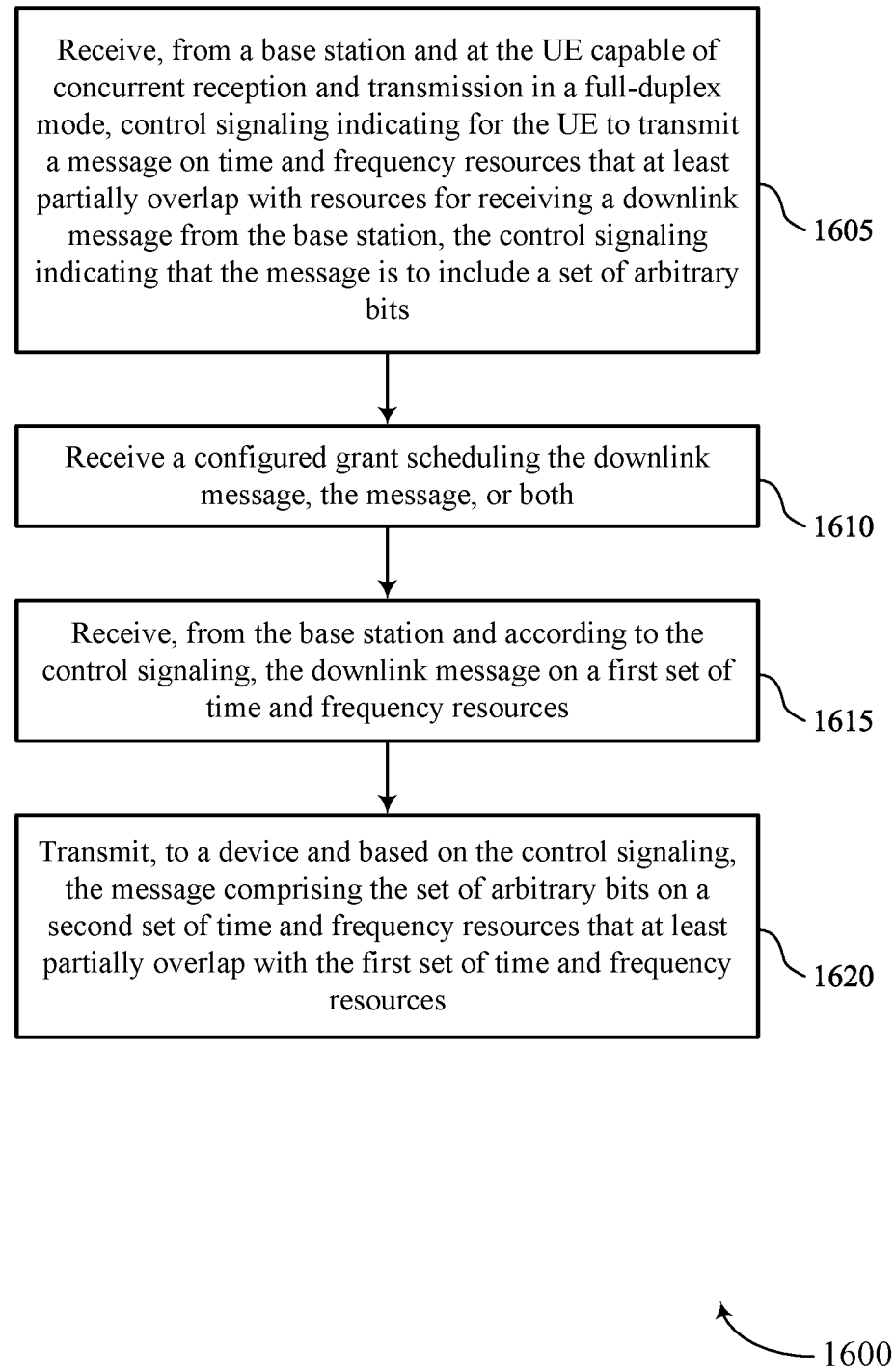

FIG. 16 shows a flowchart illustrating a method 1600 that supports full-duplex communications and physical layer security in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1605 may be performed in accordance with examples as disclosed herein. In some examples, aspects of the operations of 1605 may be performed by a message transmission indication component 825 as described with reference to FIG. 8.

At 1610, the method may include receiving a configured grant scheduling the downlink message, the message, or both. The operations of 1610 may be performed in accordance with examples as disclosed herein. In some examples, aspects of the operations of 1610 may be performed by a message transmission indication component 825 as described with reference to FIG. 8.

At 1615, the method may include receiving, from the base station and according to the control signaling, the downlink message on a first set of time and frequency resources. The operations of 1615 may be performed in accordance with examples as disclosed herein. In some examples, aspects of the operations of 1615 may be performed by a downlink message component 830 as described with reference to FIG. 8.

At 1620, the method may include transmitting, to a device and based on the control signaling, the message including the set of arbitrary bits on a second set of time and frequency resources that at least partially overlap with the first set of time and frequency resources. The operations of 1620 may be performed in accordance with examples as disclosed herein. In some examples, aspects of the operations of 1620 may be performed by a message transmission component 835 as described with reference to FIG. 8.

Figure 17:
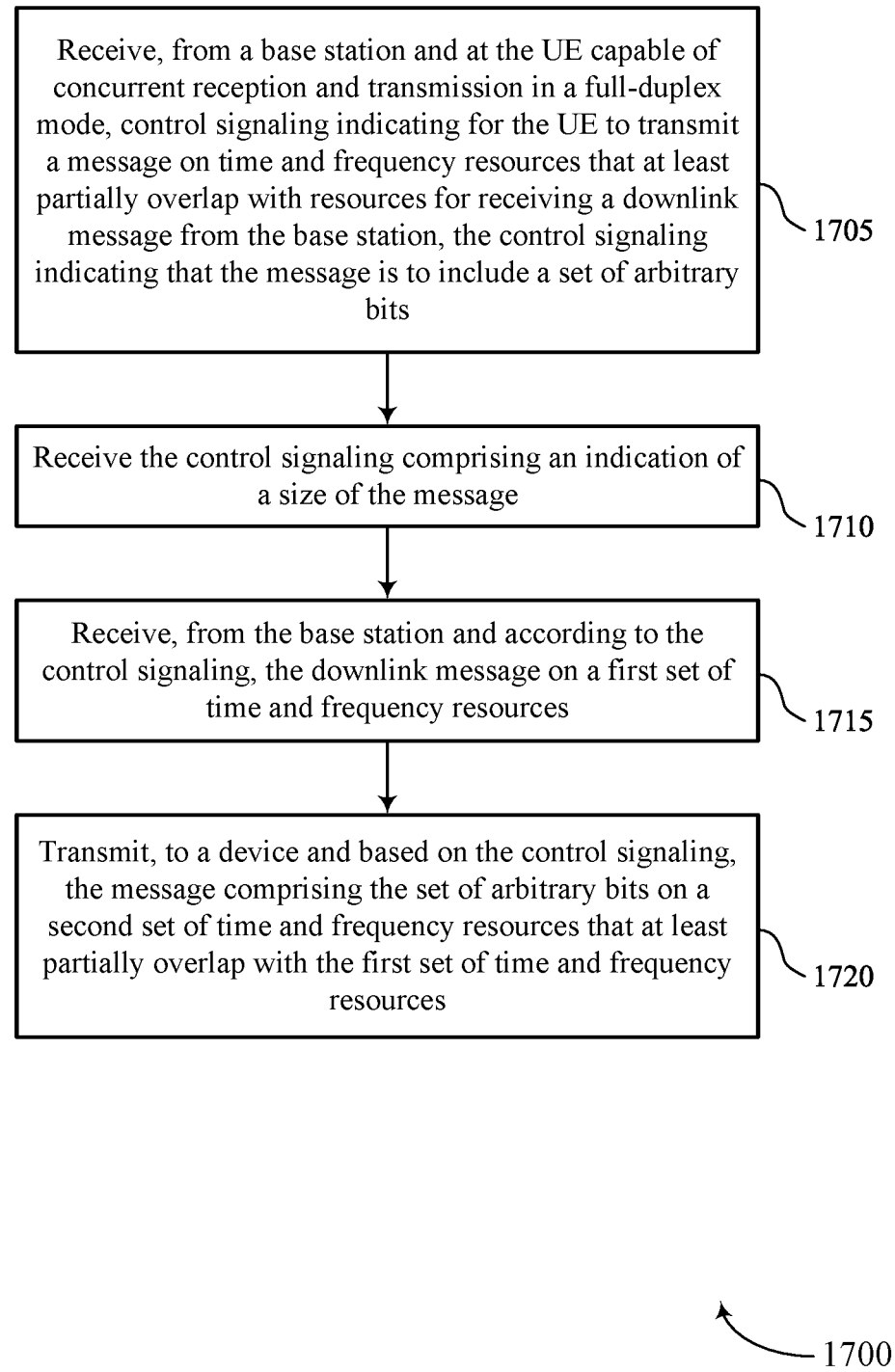

FIG. 17 shows a flowchart illustrating a method 1700 that supports full-duplex communications and physical layer security in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1705 may be performed in accordance with examples as disclosed herein. In some examples, aspects of the operations of 1705 may be performed by a message transmission indication component 825 as described with reference to FIG. 8.

At 1710, the method may include receiving the control signaling including an indication of a size of the message. The operations of 1710 may be performed in accordance with examples as disclosed herein. In some examples, aspects of the operations of 1710 may be performed by a message transmission indication component 825 as described with reference to FIG. 8.

At 1715, the method may include receiving, from the base station and according to the control signaling, the downlink message on a first set of time and frequency resources. The operations of 1715 may be performed in accordance with examples as disclosed herein. In some examples, aspects of the operations of 1715 may be performed by a downlink message component 830 as described with reference to FIG. 8.

At 1720, the method may include transmitting, to a device and based on the control signaling, the message including the set of arbitrary bits on a second set of time and frequency resources that at least partially overlap with the first set of time and frequency resources. The operations of 1720 may be performed in accordance with examples as disclosed herein. In some examples, aspects of the operations of 1720 may be performed by a message transmission component 835 as described with reference to FIG. 8.

Figure 18:
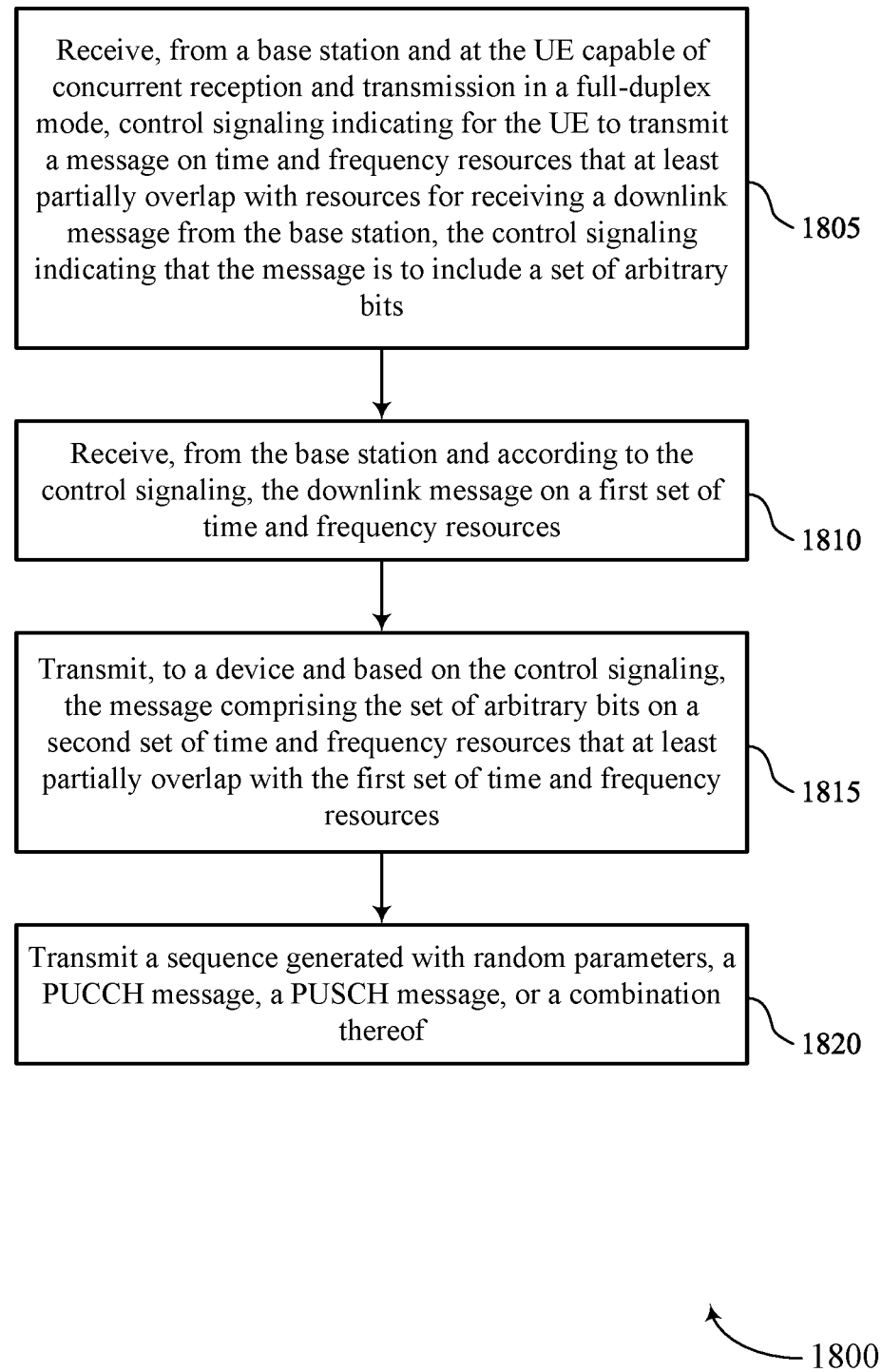

FIG. 18 shows a flowchart illustrating a method 1800 that supports full-duplex communications and physical layer security in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1805 may be performed in accordance with examples as disclosed herein. In some examples, aspects of the operations of 1805 may be performed by a message transmission indication component 825 as described with reference to FIG. 8.

At 1810, the method may include receiving, from the base station and according to the control signaling, the downlink message on a first set of time and frequency resources. The operations of 1810 may be performed in accordance with examples as disclosed herein. In some examples, aspects of the operations of 1810 may be performed by a downlink message component 830 as described with reference to FIG. 8.

At 1815, the method may include transmitting, to a device and based on the control signaling, the message including the set of arbitrary bits on a second set of time and frequency resources that at least partially overlap with the first set of time and frequency resources. The operations of 1815 may be performed in accordance with examples as disclosed herein. In some examples, aspects of the operations of 1815 may be performed by a message transmission component 835 as described with reference to FIG. 8.

At 1820, the method may include transmitting a sequence generated with random parameters, a PUCCH message, a PUSCH message, or a combination thereof. The operations of 1820 may be performed in accordance with examples as disclosed herein. In some examples, aspects of the operations of 1820 may be performed by a message transmission component 835 as described with reference to FIG. 8.

Figure 19:
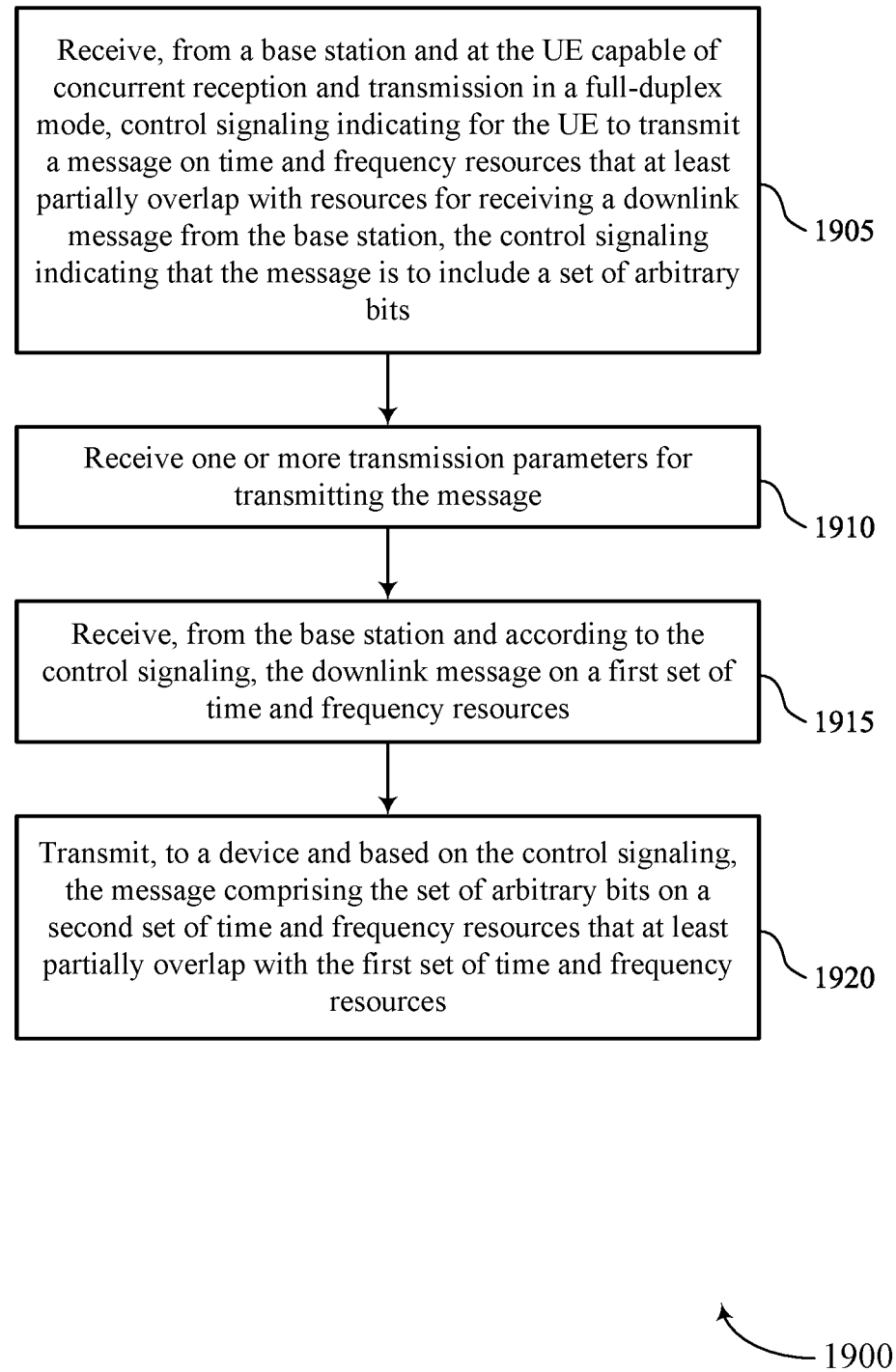

FIG. 19 shows a flowchart illustrating a method 1900 that supports full-duplex communications and physical layer security in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits. The operations of 1905 may be performed in accordance with examples as disclosed herein. In some examples, aspects of the operations of 1905 may be performed by a message transmission indication component 825 as described with reference to FIG. 8.

At 1910, the method may include receiving one or more transmission parameters for transmitting the message. The operations of 1910 may be performed in accordance with examples as disclosed herein. In some examples, aspects of the operations of 1910 may be performed by a message parameters component 840 as described with reference to FIG. 8.

At 1915, the method may include receiving, from the base station and according to the control signaling, the downlink message on a first set of time and frequency resources. The operations of 1915 may be performed in accordance with examples as disclosed herein. In some examples, aspects of the operations of 1915 may be performed by a downlink message component 830 as described with reference to FIG. 8.

At 1920, the method may include transmitting, to a device and based on the control signaling, the message including the set of arbitrary bits on a second set of time and frequency resources that at least partially overlap with the first set of time and frequency resources. The operations of 1920 may be performed in accordance with examples as disclosed herein. In some examples, aspects of the operations of 1920 may be performed by a message transmission component 835 as described with reference to FIG. 8.

Figure 20:
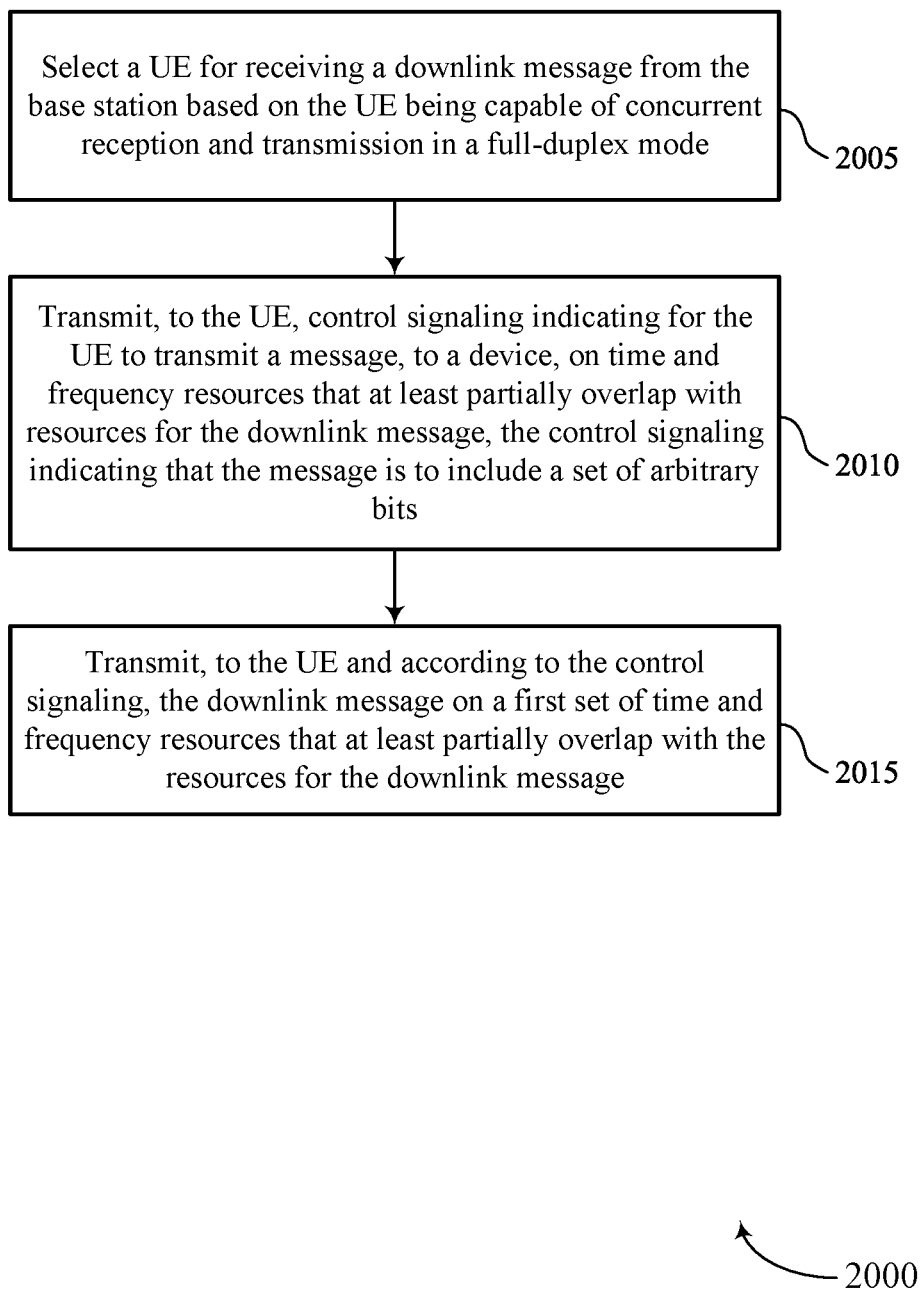

FIG. 20 shows a flowchart illustrating a method 2000 that supports full-duplex communications and physical layer security in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include selecting a UE for receiving a downlink message from the base station based on the UE being capable of concurrent reception and transmission in a full-duplex mode. The operations of 2005 may be performed in accordance with examples as disclosed herein. In some examples, aspects of the operations of 2005 may be performed by a UE selection component 1225 as described with reference to FIG. 12.

At 2010, the method may include transmitting, to the UE, control signaling indicating for the UE to transmit a message, to a device, on time and frequency resources that at least partially overlap with resources for the downlink message, the control signaling indicating that the message is to include a set of arbitrary bits. The operations of 2010 may be performed in accordance with examples as disclosed herein. In some examples, aspects of the operations of 2010 may be performed by a message indication component 1230 as described with reference to FIG. 12.

At 2015, the method may include transmitting, to the UE and according to the control signaling, the downlink message on a first set of time and frequency resources that at least partially overlap with the resources for the downlink message. The operations of 2015 may be performed in accordance with examples as disclosed herein. In some examples, aspects of the operations of 2015 may be performed by a downlink message transmission component 1235 as described with reference to FIG. 12.

Figure 21:
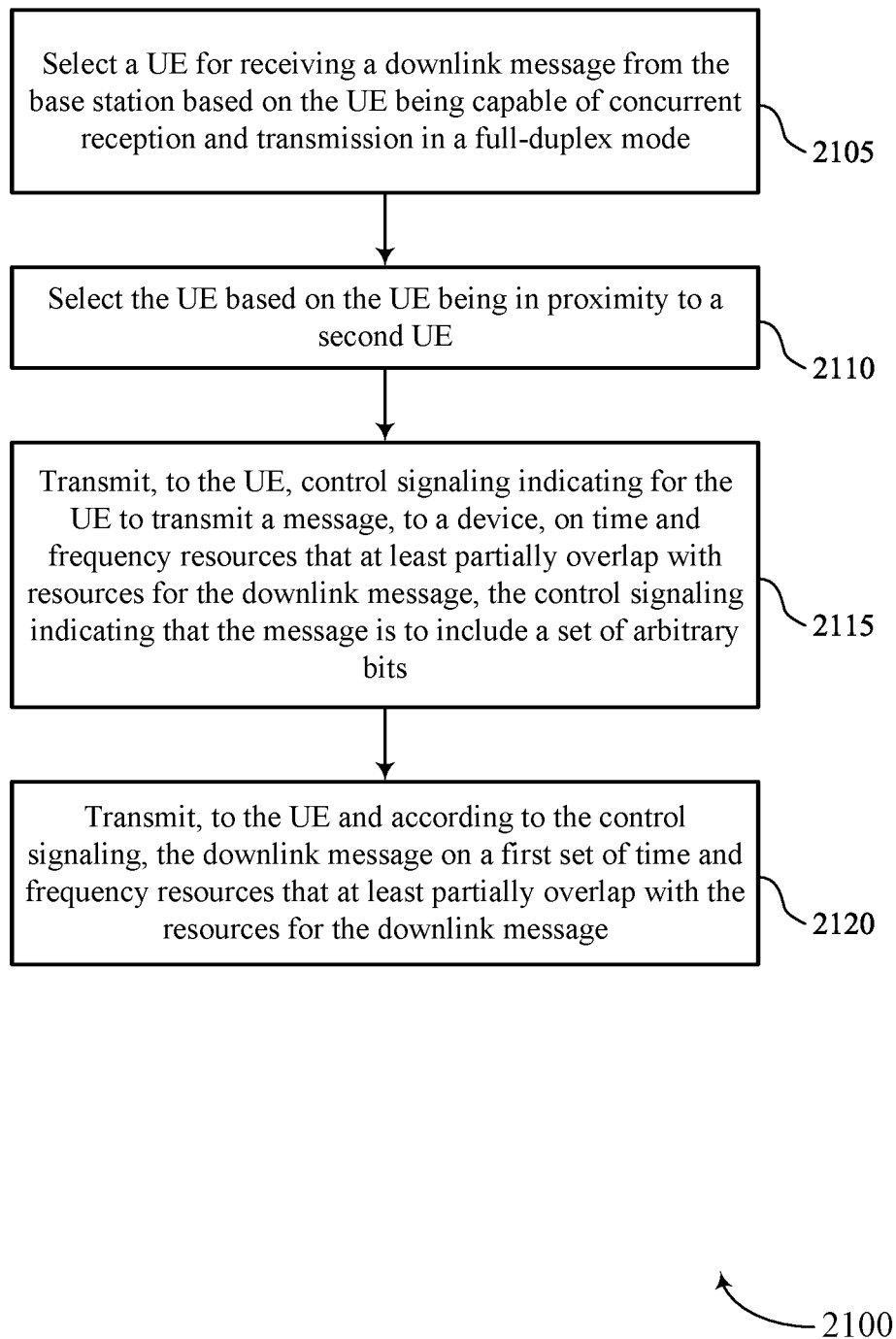

FIG. 21 shows a flowchart illustrating a method 2100 that supports full-duplex communications and physical layer security in accordance with aspects of the present disclosure. The operations of the method 2100 may be implemented by a base station or its components as described herein. For example, the operations of the method 2100 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2105, the method may include selecting a UE for receiving a downlink message from the base station based on the UE being capable of concurrent reception and transmission in a full-duplex mode. The operations of 2105 may be performed in accordance with examples as disclosed herein. In some examples, aspects of the operations of 2105 may be performed by a UE selection component 1225 as described with reference to FIG. 12.

At 2110, the method may include selecting the UE based on the UE being in proximity to a second UE. The operations of 2110 may be performed in accordance with examples as disclosed herein. In some examples, aspects of the operations of 2110 may be performed by a UE selection component 1225 as described with reference to FIG. 12.

At 2115, the method may include transmitting, to the UE, control signaling indicating for the UE to transmit a message, to a device, on time and frequency resources that at least partially overlap with resources for the downlink message, the control signaling indicating that the message is to include a set of arbitrary bits. The operations of 2115 may be performed in accordance with examples as disclosed herein. In some examples, aspects of the operations of 2115 may be performed by a message indication component 1230 as described with reference to FIG. 12.

At 2120, the method may include transmitting, to the UE and according to the control signaling, the downlink message on a first set of time and frequency resources that at least partially overlap with the resources for the downlink message. The operations of 2120 may be performed in accordance with examples as disclosed herein. In some examples, aspects of the operations of 2120 may be performed by a downlink message transmission component 1235 as described with reference to FIG. 12.

The following provides an overview of aspects of the present disclosure:

Aspect 1: A method for wireless communications at a UE, comprising: receiving, from a base station and at the UE capable of concurrent reception and transmission in a full-duplex mode, control signaling indicating for the UE to transmit a message on time and frequency resources that at least partially overlap with resources for receiving a downlink message from the base station, the control signaling indicating that the message is to include a set of arbitrary bits; receiving, from the base station and according to the control signaling, the downlink message on a first set of time and frequency resources; and transmitting, to a device and based at least in part on the control signaling, the message comprising the set of arbitrary bits on a second set of time and frequency resources that at least partially overlap with the first set of time and frequency resources.

Aspect 2: The method of aspect 1, wherein receiving the control signaling further comprises: receiving a dynamic grant scheduling the downlink message, the message, or both.

Aspect 3: The method of aspect 1, wherein receiving the control signaling further comprises: receiving a configured grant scheduling the downlink message, the message, or both.

Aspect 4: The method of aspect 3, wherein the configured grant indicates that the message is linked to the downlink message.

Aspect 5: The method of any of aspects 1 through 4, wherein receiving the control signaling further comprises: receiving the control signaling comprising an indication of a size of the message.

Aspect 6: The method of aspect 5, further comprising: receiving a first indication of a plurality of sizes for the message via radio resource control signaling; and receiving a second indication of a first size of the plurality of sizes for the message via downlink control information.

Aspect 7: The method of any of aspects 1 through 6, further comprising: generating a number of bits for the set of arbitrary bits to transmit in the message based at least in part on one or more transmission parameters for the message, wherein transmitting the message is based at least in part on generating the number of bits for the set of arbitrary bits.

Aspect 8: The method of aspect 7, wherein the one or more transmission parameters for the message comprise a number of available resources for the message, a modulation and coding scheme, or both.

Aspect 9: The method of any of aspects 1 through 8, wherein transmitting the message comprises: transmitting a sequence generated with random parameters, a physical uplink control channel message, a physical uplink shared channel message, or a combination thereof.

Aspect 10: The method of any of aspects 1 through 9, wherein receiving the control signaling comprises: receiving one or more transmission parameters for transmitting the message.

Aspect 11: The method of aspect 10, wherein the one or more transmission parameters comprise a transmission beam for transmitting the message, a modulation and coding scheme for transmitting the message, power control information for transmitting the message, or a combination thereof.

Aspect 12: The method of any of aspects 1 through 11, further comprising: determining an amount of overlap between the first set of time and frequency resources and the second set of time and frequency resources based at least in part on an amount of self-interference experienced at the UE.

Aspect 13: The method of aspect 12, further comprising: receiving, from the base station, an indication comprising the amount of overlap.

Aspect 14: The method of aspect 12, further comprising: transmitting, to the base station, an indication comprising the amount of overlap.

Aspect 15: The method of any of aspects 12 through 14, further comprising: receiving, from the base station, an indication comprising a self-interference threshold, wherein the amount of overlap is determined based at least in part on the self-interference threshold.

Aspect 16: The method of any of aspects 1 through 15, wherein receiving the control signaling comprises: receiving the control signaling comprising a bit activating the message in a downlink control information message scheduling the downlink message.

Aspect 17: The method of any of aspects 1 through 16, further comprising: receiving, from the base station, an indication for the UE to receive the downlink message on the first set of time and frequency resources, wherein transmitting the message is based at least in part on receiving the indication for the UE to receive the downlink message.

Aspect 18: The method of any of aspects 1 through 17, wherein the control signaling indicating for the UE to transmit the message is different than other control signaling indicating for the UE to transmit an uplink message to the base station.

Aspect 19: A method for wireless communications at a base station, comprising: selecting a UE for receiving a downlink message from the base station based at least in part on the UE being capable of concurrent reception and transmission in a full-duplex mode; transmitting, to the UE, control signaling indicating for the UE to transmit a message, to a device, on time and frequency resources that at least partially overlap with resources for the downlink message, the control signaling indicating that the message is to include a set of arbitrary bits; and transmitting, to the UE and according to the control signaling, the downlink message on a first set of time and frequency resources that at least partially overlap with the resources for the downlink message.

Aspect 20: The method of aspect 19, wherein transmitting the control signaling comprises: transmitting a dynamic grant scheduling the downlink message, the message, or both.

Aspect 21: The method of aspect 19, wherein transmitting the control signaling comprises: transmitting a configured grant scheduling the downlink message, the message, or both.

Aspect 22: The method of aspect 21, wherein the configured grant indicates the message is linked to the downlink message.

Aspect 23: The method of any of aspects 19 through 22, wherein transmitting the control signaling comprises: transmitting the control signaling comprising an indication of a size of the message.

Aspect 24: The method of aspect 23, further comprising: transmitting a first indication of a plurality of sizes for the message via radio resource control signaling; and transmitting a second indication of a first size of the plurality of sizes for the message via downlink control information.

Aspect 25: The method of any of aspects 19 through 24, wherein transmitting the control signaling comprises: transmitting one or more transmission parameters for the UE to transmit the message.

Aspect 26: The method of aspect 25, wherein the one or more transmission parameters comprise a transmission beam for transmitting the message, a modulation and coding scheme for transmitting the message, power control information for transmitting the message, or a combination thereof.

Aspect 27: The method of any of aspects 19 through 26, further comprising: determining an amount of overlap between the first set of time and frequency resources and a second set of time and frequency resources based at least in part on an amount of self-interference experienced at the UE.

Aspect 28: The method of aspect 27, further comprising: transmitting, to the UE, an indication comprising the amount of overlap.

Aspect 29: The method of aspect 27, further comprising: receiving, from the UE, an indication comprising the amount of overlap.

Aspect 30: The method of any of aspects 27 through 29, further comprising: transmitting, to the UE, an indication comprising a self-interference threshold, wherein the amount of overlap is determined based at least in part on the self-interference threshold.

Aspect 31: The method of any of aspects 19 through 30, wherein transmitting the control signaling comprises: transmitting the control signaling comprising a bit activating the message in a downlink control information message scheduling the downlink message.

Aspect 32: The method of any of aspects 19 through 31, wherein selecting the UE further comprises: selecting the UE based at least in part on the UE being in proximity to a second UE.

Aspect 33: The method of any of aspects 19 through 32, further comprising: transmitting, to the UE, an indication for the UE to receive the downlink message on the first set of time and frequency resources, wherein receiving the message is based at least in part on transmitting the indication for the UE to receive the downlink message.

Aspect 34: The method of any of aspects 19 through 33, wherein the control signaling indicating for the UE to transmit the message is different than other control signaling indicating for the UE to transmit an uplink message to the base station.

Aspect 35: An apparatus for wireless communications at a UE, comprising a processor; memory coupled with the processor; and instructions stored in the memory and executable by the processor to cause the apparatus to perform a method of any of aspects 1 through 18.

Aspect 36: An apparatus for wireless communications at a UE, comprising at least one means for performing a method of any of aspects 1 through 18.

Aspect 37: A non-transitory computer-readable medium storing code for wireless communications at a UE, the code comprising instructions executable by a processor to perform a method of any of aspects 1 through 18.

Aspect 38: An apparatus for wireless communications at a base station, comprising a processor; memory coupled with the processor; and instructions stored in the memory and executable by the processor to cause the apparatus to perform a method of any of aspects 19 through 34.

Aspect 39: An apparatus for wireless communications at a base station, comprising at least one means for performing a method of any of aspects 19 through 34.

Aspect 40: A non-transitory computer-readable medium storing code for wireless communications at a base station, the code comprising instructions executable by a processor to perform a method of any of aspects 19 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a base station and at the UE capable of concurrent reception and transmission in a full-duplex mode, control signaling indicating for the UE to transmit a message on time and frequency resources that at least partially overlap with resources to be used by the UE for receiving a downlink message from the base station, the control signaling indicating that the message is to include a set of arbitrary bits for decreasing an ability of a device in proximity to the UE to decode at least a portion of the downlink message;

receiving, from the base station and at the UE, and according to the control signaling, the downlink message on a first set of time and frequency resources; and transmitting, by the UE to the device, and based at least in part on the control signaling, the message comprising the set of arbitrary bits on a second set of time and frequency resources that at least partially overlap with the first set of time and frequency resources.

2. The method of claim 1, wherein receiving the control signaling further comprises:
receiving a dynamic grant scheduling the downlink message, the message, or both.

3. The method of claim 1, wherein receiving the control signaling further comprises:
receiving a configured grant scheduling the downlink message, the message, or both.

4. The method of claim 3, wherein the configured grant indicates that the message is linked to the downlink message.

5. The method of claim 1, wherein receiving the control signaling further comprises:
receiving the control signaling comprising an indication of a size of the message.

6. The method of claim 5, further comprising:
receiving a first indication of a plurality of sizes for the message via radio resource control signaling; and
receiving a second indication of a first size of the plurality of sizes for the message via downlink control information.

7. The method of claim 1, further comprising:
generating a number of bits for the set of arbitrary bits to transmit in the message based at least in part on one or more transmission parameters for the message, wherein transmitting the message is based at least in part on generating the number of bits for the set of arbitrary bits.

8. The method of claim 7, wherein the one or more transmission parameters for the message comprise a number of available resources for the message, a modulation and coding scheme, or both.

9. The method of claim 1, wherein transmitting the message comprises:
transmitting a sequence generated with random parameters, a physical uplink control channel message, a physical uplink shared channel message, or a combination thereof.

10. The method of claim 1, wherein receiving the control signaling comprises:
receiving one or more transmission parameters for transmitting the message.

11. The method of claim 10, wherein the one or more transmission parameters comprise a transmission beam for transmitting the message, a modulation and coding scheme for transmitting the message, power control information for transmitting the message, or a combination thereof.

12. The method of claim 1, further comprising:
determining an amount of overlap between the first set of time and frequency resources and the second set of time and frequency resources based at least in part on an amount of self-interference experienced at the UE.

13. The method of claim 12, further comprising:
receiving, from the base station, an indication comprising the amount of overlap.

14. The method of claim 12, further comprising:
transmitting, to the base station, an indication comprising the amount of overlap.

15. The method of claim 12, further comprising:
receiving, from the base station, an indication comprising a self-interference threshold, wherein the amount of overlap is determined based at least in part on the self-interference threshold.

16. The method of claim 1, wherein receiving the control signaling comprises:
receiving the control signaling comprising a bit activating the message in a downlink control information message scheduling the downlink message.

17. The method of claim 1, further comprising:
receiving, from the base station, an indication for the UE to receive the downlink message on the first set of time and frequency resources, wherein transmitting the message is based at least in part on receiving the indication for the UE to receive the downlink message.

18. The method of claim 1, wherein the control signaling indicating for the UE to transmit the message is different than other control signaling indicating for the UE to transmit an uplink message to the base station.

19. A method for wireless communications at a base station, comprising:
selecting a user equipment (UE) for receiving a downlink message from the base station based at least in part on the UE being capable of concurrent reception and transmission in a full-duplex mode;
transmitting, to the UE, control signaling indicating for the UE to transmit a message, to a device, on time and frequency resources that at least partially overlap with resources to be used by the UE for the downlink message, the control signaling indicating that the message is to include a set of arbitrary bits for decreasing an ability of the device to decode at least a portion of the downlink message; and
transmitting, to the UE and according to the control signaling, the downlink message on a first set of time and frequency resources that at least partially overlap with the resources for the downlink message.

20. The method of claim 19, further comprising:
determining an amount of overlap between the first set of time and frequency resources and a second set of time and frequency resources based at least in part on an amount of self-interference experienced at the UE.

21. The method of claim 19, wherein selecting the UE further comprises:
selecting the UE based at least in part on the UE being in proximity to the device.

22. An apparatus for wireless communications at a user equipment (UE), comprising:
a processor;
memory coupled with the processor; and
instructions stored in the memory and executable by the processor to cause the apparatus to:
receive, from a base station and at the UE capable of concurrent reception and transmission in a full-duplex mode, control signaling indicating for the UE to transmit a message on time and frequency resources that at least partially overlap with resources to be used by the UE for receiving a downlink message from the base station, the control signaling indicating that the message is to include a set of arbitrary bits for decreasing an ability of a device in proximity to the UE to decode at least a portion of the downlink message;
receive, from the base station and at the UE, and according to the control signaling, the downlink message on a first set of time and frequency resources; and
transmit, by the UE to the device, and based at least in part on the control signaling, the message comprising the set of arbitrary bits on a second set of time and frequency resources that at least partially overlap with the first set of time and frequency resources.

23. The apparatus of claim 22, wherein the instructions to receive the control signaling are further executable by the processor to cause the apparatus to:

receive a dynamic grant scheduling the downlink message, the message, or both.

24. The apparatus of claim 22, wherein the instructions to receive the control signaling are further executable by the processor to cause the apparatus to:
receive a configured grant scheduling the downlink message, the message, or both.

25. The apparatus of claim 22, wherein the instructions to receive the control signaling are further executable by the processor to cause the apparatus to:
receive the control signaling comprising an indication of a size of the message.

26. The apparatus of claim 25, wherein the instructions are further executable by the processor to cause the apparatus to:
receive a first indication of a plurality of sizes for the message via radio resource control signaling; and
receive a second indication of a first size of the plurality of sizes for the message via downlink control information.

27. The apparatus of claim 22, wherein the instructions are further executable by the processor to cause the apparatus to:
generate a number of bits for the set of arbitrary bits to transmit in the message based at least in part on one or more transmission parameters for the message, wherein transmitting the message is based at least in part on generating the number of bits for the set of arbitrary bits.

28. The apparatus of claim 22, wherein the instructions to transmit the message are further executable by the processor to cause the apparatus to:
transmit a sequence generated with random parameters, a physical uplink control channel message, a physical uplink shared channel message, or a combination thereof.

29. The apparatus of claim 22, wherein the instructions to receive the control signaling are further executable by the processor to cause the apparatus to:
receive one or more transmission parameters for transmitting the message.

30. An apparatus for wireless communications at a base station, comprising:
a processor;
memory coupled with the processor; and
instructions stored in the memory and executable by the processor to cause the apparatus to:
select a user equipment (UE) for receiving a downlink message from the base station based at least in part on the UE being capable of concurrent reception and transmission in a full-duplex mode;
transmit, to the UE, control signaling indicating for the UE to transmit a message, to a device, on time and frequency resources that at least partially overlap with resources to be used by the UE for the downlink message, the control signaling indicating that the message is to include a set of arbitrary bits for decreasing an ability of the device to decode at least a portion of the downlink message; and
transmit, to the UE and according to the control signaling, the downlink message on a first set of time and frequency resources that at least partially overlap with the resources for the downlink message.

\* \* \* \* \*